United States Patent
Kanada et al.

(10) Patent No.: US 7,433,153 B2
(45) Date of Patent: Oct. 7, 2008

(54) SOFT MAGNETIC FILM AND THIN FILM MAGNETIC HEAD USING SOFT MAGNETIC FILM, PROCESS FOR MANUFACTURING SOFT MAGNETIC FILM AND PROCESS FOR MANUFACTURING THIN FILM MAGNETIC HEAD

(75) Inventors: Yoshihiro Kanada, Niigata-ken (JP); Hisayuki Yazawa, Niigata-ken (JP)

(73) Assignee: TDK Corporation, Tokyo (JP)

( * ) Notice: Subject to any disclaimer, the term of this patent is extended or adjusted under 35 U.S.C. 154(b) by 1128 days.

(21) Appl. No.: 10/235,262

(22) Filed: Sep. 5, 2002

(65) Prior Publication Data

US 2003/0048582 A1 Mar. 13, 2003

(30) Foreign Application Priority Data

Sep. 7, 2001 (JP) .............................. 2001-271140

(51) Int. Cl.
G11B 5/31 (2006.01)
G11B 5/39 (2006.01)
G11B 23/00 (2006.01)

(52) U.S. Cl. ....................................... 360/126; 428/692
(58) Field of Classification Search ........................ None
See application file for complete search history.

(56) References Cited

U.S. PATENT DOCUMENTS

| | | | | |
|---|---|---|---|---|
| 4,299,622 A | * | 11/1981 | Kimira et al. | 420/77 |
| 4,661,216 A | * | 4/1987 | Anderson et al. | 205/260 |
| 4,814,921 A | * | 3/1989 | Hamakawa et al. | 360/126 |
| 5,057,380 A | * | 10/1991 | Hayashi et al. | 428/829 |
| 5,091,266 A | | 2/1992 | Omata | |
| 5,576,099 A | | 11/1996 | Canaperi et al. | |
| 5,673,162 A | * | 9/1997 | Saito | 360/327.22 |
| 5,796,560 A | * | 8/1998 | Saito et al. | 360/324 |
| 6,120,918 A | | 9/2000 | Osaka et al. | |
| 6,353,511 B1 | * | 3/2002 | Shi et al. | 360/126 |

(Continued)

FOREIGN PATENT DOCUMENTS

JP 2 68906 3/1990

(Continued)

OTHER PUBLICATIONS

Copy of Notification of Reasons of Refusal from corresponding Japanese patent application No. 2001-271140 (Sep. 21, 2004).

Primary Examiner—Angel Castro
Assistant Examiner—Christopher R. Magee
(74) Attorney, Agent, or Firm—Brinks Hofer Gilson & Lione

(57) ABSTRACT

The upper magnetic pole layer and/or lower magnetic pole layer comprises a soft magnetic film having a variable region in which the chemical composition of Fe changes in the direction of thickness in at least a part thereof, and the difference of the proportions of Fe between the regions most abundant in Fe and most deficient in Fe is 4% by mass or more in the variable region. The structure of the soft magnetic film permits the saturation magnetic flux density Bs to be improved while decreasing the coercive force Hc by forming fine crystal grains, thereby enabling a thin film magnetic head excellent in high density recording to be manufactured.

18 Claims, 20 Drawing Sheets

U.S. PATENT DOCUMENTS 6,449,122 B1 9/2002 Yazawa et al.
2003/0072104 A1 4/2003 Sato et al.

FOREIGN PATENT DOCUMENTS

| | | |
|---|---|---|
| JP | 4 297004 | 10/1992 |
| JP | 5 29172 | 2/1993 |
| JP | 7 192920 | 7/1995 |
| JP | 2001 6931 | 1/2001 |
| JP | 2001 143222 | 5/2001 |
| JP | 2003-59717 | 2/2003 |

* cited by examiner

SOFT MAGNETIC FILM AND THIN FILM MAGNETIC HEAD USING SOFT MAGNETIC FILM, PROCESS FOR MANUFACTURING SOFT MAGNETIC FILM AND PROCESS FOR MANUFACTURING THIN FILM MAGNETIC HEAD

BACKGROUND OF THE INVENTION

1. Field of the Invention

The present invention relates to a soft magnetic film comprising Fe and magnetic elements other than Fe that are used as a core material of a recording thin film magnetic head (an inductive head) integrated, for example, into a hard disk device. In particular, the present invention relates to a soft magnetic film capable of improving a saturation magnetic flux density Bs and decreasing a coercive force Hc and a thin film magnetic head using the soft magnetic film, and a process for manufacturing the soft magnetic film and a process for manufacturing the thin film magnetic head.

2. Description of the Related Art

A NiFe based alloy (a permalloy) has been generally used for a core material constituting a recording thin film magnetic head (an inductive head) integrated, for example, into a hard disk device.

The NiFe based alloy has relatively excellent soft magnetic characteristics that render the alloy one of the most frequently used magnetic materials due to its easiness for forming a plating layer.

The conventional NiFe based alloy comprises about 55% by mass of Fe with a saturation magnetic flux density Bs of about 1.5 T.

However, it has been required for further improvement of the recording density to enhance the saturation magnetic flux density Bs of the NiFe alloy.

Since the saturation magnetic flux density Bs mainly depends on the chemical composition of Fe, it has been emphasized to increase the chemical composition of Fe in the NiFe based alloy in order to enhance the saturation magnetic flux density Bs.

The conventional core material made of, for example, the NiFe based alloy has been formed with a uniform composition throughout the alloy, because the saturation magnetic flux density Bs has been considered to be stabilized by making the alloy to have a uniform composition.

Therefore, it has been conjectured that a higher saturation magnetic flux density Bs might be obtained by attempting to increase the chemical composition of Fe while maintaining a uniform composition of the core material.

However, it was found that the coercive force Hc is rather increased by increasing the chemical composition of Fe, although the saturation magnetic flux density is certainly increased. One reason of this phenomenon may be attributed to coarsened crystal grains as a result of increasing the chemical composition of Fe while maintaining a uniform composition.

An increased coercive force is not preferable since magnetization inversion of the core material becomes dull to deteriorate recording characteristics of the magnetic head.

SUMMARY OF THE INVENTION

Accordingly, it is an object of the present invention for solving the problems as hitherto described to provide a soft magnetic film and a thin film magnetic head using the soft magnetic film, and a process for manufacturing the soft magnetic film and a process for manufacturing the thin film magnetic head, whereby the chemical composition of Fe in the soft magnetic film is changed in the direction of thickness to enable the saturation magnetic flux density Bs to be increased while reducing the coercive force Hc.

The present invention provides a soft magnetic film comprising Fe and magnetic elements other than Fe, wherein the soft magnetic film comprises a variable region where the chemical composition of Fe changes in the direction of thickness of the film at least in a part of the film. The difference of the proportions of Fe between the regions most abundant in Fe and most deficient in Fe is 4% by mass or more.

According to the experimental results to be described hereinafter, it was confirmed that the coercive force can be effectively reduced when the difference of proportions of Fe between the regions most abundant in Fe and most deficient in Fe is 4% by mass or more, as compared with the conventional soft magnetic film that maintains an approximately uniform proportion of Fe with no change in the direction of thickness.

When the chemical composition of Fe changes in the direction of thickness, growth of crystal grains are inhibited by variation of the composition to prevent crystals from growing as large crystal grains, as compared with the conventional soft magnetic film having a uniform proportion of Fe. Accordingly, fine crystal grains are readily formed by suppressed coarse crystals from growing. Consequently, the coercive force Hc of the soft magnetic film may be reduced as compared with the conventional soft magnetic film.

According to the experimental results to be described hereinafter, the same level of the saturation magnetic flux density Bs as that in the conventional soft magnetic film may be obtained when the mean chemical composition of Fe in the soft magnetic film according to the present invention is comparable to the chemical composition of Fe in the conventional soft magnetic film. In other words, it was confirmed that a high saturation magnetic flux density Bs could be obtained by ensuring a large mean chemical composition of Fe, even when some regions have small proportions of Fe by changing the chemical composition of Fe in the direction of thickness.

Accordingly, the present invention provide a soft magnetic film capable of obtaining a high saturation magnetic flux density Bs by increasing the mean chemical composition of Fe while obtaining a lower coercive force Hc by changing the chemical composition of Fe in the direction of thickness.

Preferably, the difference of the chemical composition of Fe is 6% by mass or more, 8% by mass or more, or 10% by mass or more in the present invention.

Preferably, the chemical composition of Fe periodically changes in the direction of thickness in at least a part of the film with a length of one cycle of 10 nm or more and 150 nm or less in the present invention.

It is confirmed that the coercive force Hc may be reduced to be lower than that in the conventional soft magnetic film by allowing the chemical composition of Fe to periodically change in the direction of thickness. More preferably, the length of one cycle is 100 nm or less. It is also confirmed that the shorter length of one cycle permits the coercive force to be more properly reduced. Since the chemical composition of Fe vigorously changes in the direction of thickness as the length of one cycle is shortened, crystal growth becomes so dull and the crystal grain diameter becomes so fine that the coercive force may be more effectively reduced.

Preferably, a layer having a higher chemical composition of Fe and a layer having a lower chemical composition of Fe are alternately laminated in the direction of thickness as observed under a transmission electron microscope. Such film structure indicates that the chemical composition of Fe is periodically changing in the direction of thickness.

It is preferable in the present invention that the soft magnetic layer comprises an region (fine crystalline phase) with a crystal grain diameter of 5 nm or more and 20 nm or less, in order to properly reduce the coercive force.

Preferably, the soft magnetic layer comprises an region where a body-centered cubic structure and a face-centered cubic structure are mixed together in at least a part of the soft magnetic film in the present invention. The body-centered structure (bcc structure) and face-centered structure (fcc structure) formed by being mixed in one region permit the coercive force Hc to be more properly reduced.

Preferably, soft magnetic layer comprises a NiFe based alloy with a mean chemical composition of Fe of 65% by mass or more and 85% by mass or less in the present invention. This composition range of the soft magnetic layer permit 1.8 T or more, preferably 1.9 T or more, and more preferably 2.0 T or more of the saturation magnetic flux density Bs to be obtained.

Alternatively, it is preferable in the present invention that the soft magnetic layer comprises a CoFe based alloy with a mean chemical composition of Fe of 60% by mass or more and 80% by mass or less. This composition range of the soft magnetic layer permit 2.0 T or more, and preferably 2.2 T or more of the saturation magnetic flux density Bs to be obtained.

Preferably, the soft magnetic layer comprises a CoFeNi based alloy in the present invention. The mean chemical composition a of Co is 8% by mass or more and 48% by mass or less, the mean chemical composition b of Fe is 50% by mass or more and 90% by mass or less, and the mean chemical composition c of Ni is 2% by mass or more and 20% by mass or less with a sum of the mean chemical composition a+b+c accounting for 100% by mass. This composition range permit 2.0 T or more, preferably 2.2 T or more of the saturation magnetic flux density Bs to be obtained.

Preferably, the soft magnetic film is formed by plating.

The present invention provides a thin film magnetic head comprising a lower core layer made of a magnetic material, an upper core layer formed on the lower core layer with interposition of a magnetic gap therebetween, and a coil layer for imparting a recording magnetic field to both core layers. At least one of the core layers is formed of any one of the soft magnetic films as hitherto described.

Preferably, a lower magnetic pole layer is formed on the lower core layer by being raised up at the opposed face to a recording medium, and the lower magnetic pole layer is formed of the soft magnetic film in the present invention.

The present invention also provides a thin film magnetic head comprising a lower core layer and an upper core layer, and a magnetic pole part located between the lower core layer and upper core layer. The width of the magnetic pole part in the track width direction is restricted to be shorter than the widths of the lower core layer and upper core layer. The magnetic pole part comprises a lower magnetic pole layer in succession to the lower core layer, an upper magnetic pole layer in succession to the upper core layer, and a gap layer located between the lower magnetic pole layer and upper magnetic pole layer, or the magnetic pole part comprises the upper magnetic pole layer in succession to the upper core layer and the gap layer located between the upper magnetic pole layer and lower core layer. The upper magnetic pole layer, lower magnetic pole layer, and either the upper core layer or the lower core layer are formed of any one of the soft magnetic films as hitherto described.

The present invention provides a thin film magnetic head having a higher saturation magnetic flux density Bs and lower coercive force Hc as compared with the conventional thin film magnetic head, thereby providing a thin film magnetic head excellent in recording characteristics that can properly comply with high density recording expected in the future.

The present invention also provide a process for manufacturing a soft magnetic film comprising Fe and magnetic elements other than Fe comprising the steps of forming the soft magnetic film by electroplating while periodically changing the current density of the applied electric current in order to change the chemical composition of Fe in the direction of thickness. As a result, a variable region in which the difference of the concentration ratios of Fe between the regions most abundant in Fe and most deficient in Fe is 4% by mass or more is provided at least in a part of the soft magnetic film.

The current density of the applied electric current is periodically changing in the present invention as described above, when the soft magnetic film is formed by electroplating. This periodic change permits the chemical composition of Fe in the soft magnetic film to be changed in the direction of thickness, and a variable region in which the difference of the proportions of Fe in the portions most abundant in Fe and most deficient in Fe is 4% by mass or more may be provided at least in a part of the soft magnetic film.

Preferably, the current density of the applied electric current is periodically changed using a pulse current. This process enables the mean chemical composition of Fe in the soft magnetic film to be increased and a higher saturation magnetic flux density Bs than that in the conventional soft magnetic film to be obtained, thereby enabling a soft magnetic film capable of effectively reducing the coercive force Hc to be manufactured.

It is preferable in the present invention to provide a variable region with a difference of the proportions of Fe of 6% by mass or more, or a variable region with a difference of the proportions of Fe of 8% by mass or more, or a variable region with a difference of the proportions of Fe of 10% by mass or more, in at least a part of the soft magnetic layer.

It is also preferable in the present invention that at least a part of the chemical composition of Fe periodically changes in the direction of thickness, and the length of one cycle is 10 nm or more and 150 nm or less, more preferably 100 nm or less, in order to further reduce the coercive force Hc.

The soft magnetic layer according to the present invention preferably comprises a region with a crystal grain diameter of 5 nm or more and 20 nm or less.

The soft magnetic layer according to the present invention preferably comprises a mixed region of a body-centered cubic structure and face-centered cubic structure at least a part thereof.

The soft magnetic layer according to the present invention preferably comprises a NiFe based alloy formed by plating preferably with a mean chemical composition of Fe of 65% by mass or more and 85% by mass or less in the soft magnetic film. This composition above permits the saturation magnetic flux density Bs of the soft magnetic layer to be 1.8 T or more, preferably 1.9 T or more, and more preferably to be 2.0 T or more.

The soft magnetic layer according to the present invention preferably comprises a CoFe based alloy formed by plating preferably with a mean chemical composition of Fe of 60% by mass or more and 80% by mass or less in the soft magnetic film. This composition permits the saturation magnetic flux density Bs of the soft magnetic layer to be 2.0 T or more, and preferably 2.2 T or more.

Preferably, the soft magnetic layer comprises a CoFeNi based alloy formed by plating in the present invention. The mean chemical composition a of Co is 8% by mass or more and 48% by mass or less, the mean chemical composition b of Fe is 50% by mass or more and 90% by mass or less, and the mean chemical composition c of Ni is 2% by mass or more and 20% by mass or less with a sum of the mean chemical composition a+b+c accounting for 100% by mass. This composition permit 2.0 T or more, preferably 2.2 T or more of the saturation magnetic flux density Bs to be obtained.

While the present invention provides a process for manufacturing a thin film magnetic head comprising a lower core layer made of a magnetic material, an upper core layer formed on the lower core layer with interposition of a magnetic gap therebetween, and a coil layer for imparting a recording magnetic field to both coil layers, at least one of the core layers is formed of any one of the soft magnetic films as hitherto described formed by plating.

It is preferable in the present invention that the lower magnetic pole layer is formed on the lower core layer by being raised up at the opposed face to a recording medium, and the lower magnetic pole layer is formed of the soft magnetic film by plating.

The present invention provides a thin film magnetic head comprising a lower core layer and an upper core layer, and a magnetic pole part located between the lower core layer and upper core layer. The width of the magnetic pole part in the track width direction is restricted to be shorter than the widths of the lower core layer and upper core layer. The magnetic pole part comprises a lower magnetic pole layer in succession to the lower core layer, an upper magnetic pole layer in succession to the upper core layer, and a gap layer located between the lower magnetic pole layer and upper magnetic pole layer, or the magnetic pole part comprises the upper magnetic pole layer in succession to the upper core layer and the gap layer located between the upper magnetic pole layer and lower core layer. The upper magnetic pole layer, lower magnetic pole layer, and either the upper core layer or the lower core layer are formed of any one of the soft magnetic films as hither to described formed by plating.

The chemical composition of Fe in the core layer and magnetic pole layer can be properly changed in the direction of thickness, by allowing the current density of the applied electric current to periodically change in forming the core layer and magnetic pole layer by electroplating. Consequently, a thin film magnetic head having both higher saturation magnetic flux density Bs and lower coercive force than those in the conventional art can be adequately and easily manufactured.

DESCRIPTION OF THE PREFERRED EMBODIMENTS

Figure 1:
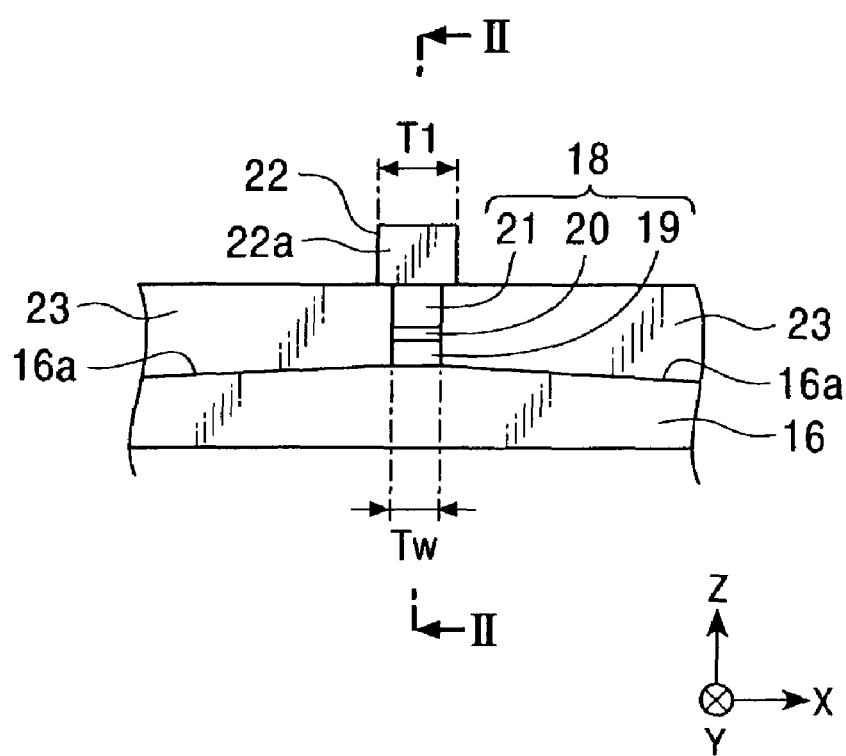
FIG. 1 shows a partial front view of the thin film magnetic head according to the first embodiment of the present invention.
Figure 2:
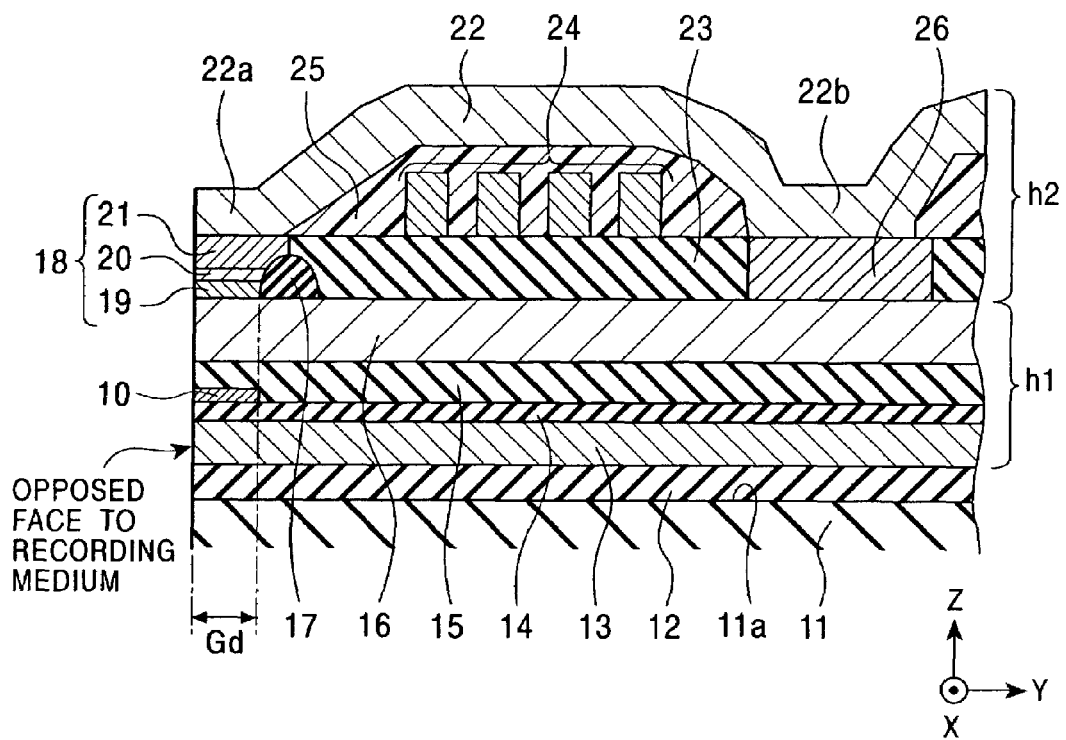
FIG. 2 shows a vertical cross section of the thin film magnetic head shown in FIG. 1.

FIG. 1 shows a partial front view of the thin film magnetic head in the first embodiment of the present invention, and FIG. 2 shows a cross section of the thin film magnetic head cut along the line II—II in FIG. 1 and viewed in the direction of the arrows in FIG. 1.

The thin film magnetic head according to the present invention is formed at a trailing side face 11a of a ceramic slider 11 constituting a floating type head, and is a MR/inductive composite type thin film magnetic head (simply referred to as a thin film magnetic head hereinafter) comprising a laminated MR head h1 and write inductive head h2.

The MR head h1 detects a leak magnetic field from a recording medium such as a hard disk to read recorded signals by taking advantage of a magnetoresistive effect.

As shown in FIG. 2, a lower shield layer 13 made of a magnetic material such as a NiFe alloy is formed on the trailing side face 11a of the slider 11 with an $Al_2O_3$ film 12 formed on the slider, and a lower gap layer 14 made of an insulation material is formed on the lower shield layer.

A magnetoresistive element 10 such as an anisotropic magnetoresistive (AMR) element taking advantage of an anisotropic magnetoresistive effect, a giant magnetoresistive (GRM) element taking advantage of a giant magnetoresistive effect, or a tunnel type magnetoresistive (TMR) element taking advantage of a tunnel effect is formed on the lower gap layer 14 from an opposed face to a recording medium in the height direction (Y-direction in the drawing), and an upper gap layer 15 is formed on the magnetoresistive element 10 and lower gap layer 14. An upper shield layer 16 made of a magnetic material such as a NiFe alloy is further formed on the upper gap layer 15. The MR head h1 comprises a laminated film from the lower shield layer 13 through the upper shield layer 16.

The upper shield layer 16 (lower core layer) also serves as the lower core layer of an inductive head h2 in the embodiments shown in FIGS. 1 and 2. A Gd defining layer 17 is formed on the lower core layer 16 to restrict a gap depth (Gd) by the length from the opposed face to the recording medium through the tip of the Gd defining layer 17. The Gd defining layer 17 is formed of, for example, an insulation material.

The upper face 16a of the lower core layer 16 is formed as inclined faces inclined toward the lower face in accordance with the distance from the end of a magnetic pole part 18 in the track width direction (X-direction) as shown in FIG. 1, to enable side fringing from being generated.

As shown in FIG. 2, a magnetic pole part 18 is formed from the opposed face to the recording medium through the Gd defining layer 17.

The magnetic pole part 18 comprises a lower magnetic pole layer 19, a nonmagnetic gap layer 20 and an upper magnetic pole layer 21 laminated from the bottom in this order.

The lower magnetic pole layer 19 is directly formed on the lower core layer 16 by plating. The gap layer 20 formed on the lower magnetic pole layer 19 is preferably formed with a nonmagnetic metal capable of plating. Preferable examples thereof are preferably selected from at least one of NiP, NiPd, NiW, NiMo, Au, Pt, Rh, Pd, Ru and Cr.

In a typical embodiment of the present invention, NiP is used for the Gap layer 20, because the gap layer 20 becomes adequately nonmagnetic by forming the gap layer 20 with NiP.

The upper magnetic pole layer 21 formed on the gap layer 20 is magnetically coupled with the upper core layer 22 formed on the upper magnetic layer.

It is possible to continuously form the lower magnetic pole layer 19, gap layer 20 and upper magnetic pole layer 21 by plating by forming the gap layer 20 with a nonmagnetic metal capable of plating.

The magnetic pole part 18 may comprise two layers of the gap layer 20 and upper magnetic pole layer 21.

As shown in FIG. 1, the magnetic pole part 18 is formed with a track width Tw in the track width direction. The track width is 0.1 μm or more and 0.8 μm or less, more preferably 0.1 μm or more and 0.5 μm or less.

The ratio of the height to the track width Tw of the magnetic pole part 18 is about 3.0 to 40.0.

As shown in FIGS. 1 and 2, insulation layers 23 are formed in both side regions in the track with direction (X-direction) and in the height direction (Y-direction) at the back of the magnetic pole part 18 of the magnetic pole part 18. The upper face of the insulation layer 23 is flush with the upper face of the magnetic pole part 18.

As shown in FIG. 2, a coil layer 24 is spirally formed by patterning on the insulation layer 23. The coil layer 24 is covered with an insulation layer 25 made of an organic insulation material.

As shown in FIG. 2, the upper core layer 22 is patterned from on the magnetic pole part 18 through on the insulation layer 25 by flame plating. As shown in FIG. 1, the tip 22a of the upper core layer 22 is formed with an width T1 in the track width direction on the opposed face to the recording medium with the width T1 larger than the track width Tw.

As shown in FIG. 2, the base 22b of the upper core layer 22 is directly bonded to a coupling layer (back-gap layer) 26 formed on the lower core layer 16.

Soft magnetic films used for the upper magnetic pole layer 21 and/or lower magnetic pole layer 19 has following characteristics in the present invention.

According to the present invention, the soft magnetic film is made of a material comprising Fe and magnetic elements other than Fe, and a variable region in which the chemical composition of Fe changes in the direction of thickness (the Z-direction) is formed in at least a part of the soft magnetic film.

The difference of the proportions of Fe between the regions most abundant in Fe and most deficient in Fe is 4% by mass or more in the variable region in the present invention.

Figure 3:
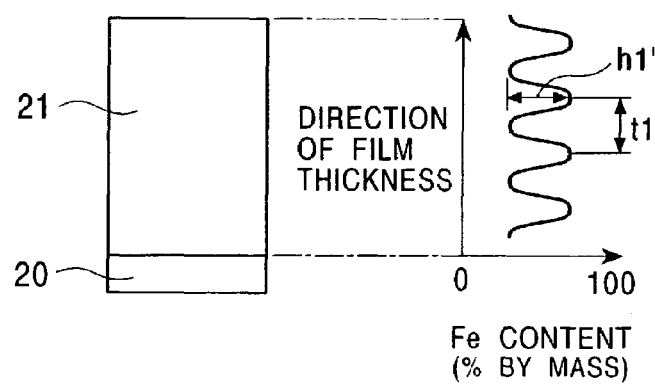
FIG. 3 schematically illustrates variation of the chemical composition of Fe in the upper magnetic pole layer shown in FIG. 1.

FIG. 3 illustrates a diagram showing variation of the chemical composition of Fe in the direction of thickness when the upper magnetic pole layer 21 is formed of the soft magnetic layer comprising Fe and magnetic elements other than Fe.

While the chemical composition of Fe was approximately uniform in the direction of thickness in the conventional art, the chemical composition of Fe changes in the direction of thickens in the present invention as shown in FIG. 3, and the difference h1' of proportions of Fe between the regions most abundant in Fe and most deficient in Fe is 4% by mass.

The coercive force Hc can be properly decreased as compared in the conventional art by adjusting the distribution of Fe as described above.

Crystal grains of the magnetic elements constituting the soft magnetic film is prevented from growing by allowing the chemical composition of Fe to change in the direction of thickness, thereby making large crystal grains to be hardly grown. Consequently, the crystal grains become difficult to be coarse, and the coercive force can be decreased by forming fine crystal grains.

The difference of the proportions of Fe between the regions most abundant in Fe and most deficient in Fe in the variable region formed in the soft magnetic film is preferably 6% by mass or more, more preferably 8% by mass or more, and most preferably 10% by mass or more. The crystal grains are hardly grown as the variation of the difference of the chemical composition of Fe is greater and are preferentially grown as fine crystals, thereby enabling the coercive force Hc to be reduced.

It is preferable in the present invention that the chemical composition of Fe in the soft magnetic film periodically changes in the direction of thickness (in the Z-direction). The proportion (% by mass) of Fe incorporated in the upper magnetic pole layer 21 periodically changes in the direction of thickness as shown in FIG. 3, and the length of one cycle is represented by t1.

The length t1 of one cycle is preferably 10 nm or more and 150 nm or less in the present invention. It is not preferable that the length t1 of one cycle is less than 10 nm, since desired variation of the composition cannot be provoked to result in coarsening of the crystal grain with an increase of the coercive force Hc. When the length t1 of one cycle is larger than 150 nm, on the other hand, variation of the chemical composition of Fe in the direction of thickness becomes so mild that coarsening of the crystal grains is accelerated to make it impossible to properly reduce the coercive force Hc.

Variation of the chemical composition of Fe in the direction of thickness becomes so vigorous when the length t1 of one cycle falls within a range from 10 nm or more to 150 nm or less that crystal growth is adequately inhibited. Consequently, the crystal grain diameter becomes fine, and the coercive force Hc is properly reduced.

It is also preferable in the present invention that the length t1 of one cycle is 100 nm or less. The shorter the length t1 of one cycle is, crystal growth is more effectively inhibited and fine crystal grains are formed, thereby enabling the coercive force Hc to be further decreased.

As will be described in the experiments hereinafter, the soft magnetic film preferably exhibits a film configuration in which layers with a high chemical composition of Fe and low chemical composition of Fe are alternately laminated in the present invention, when the cross section of the soft magnetic film in the direction of thickness is observed on a transmission electron microscopic (TME) photograph.

The layers with a high chemical composition of Fe and low chemical composition of Fe may be distinguished with each other by color differences among the layers on the transmission electron microscopic photograph. Alternately laminated layers with a deep color and pale color are observed in the soft magnetic film on the transmission electron microscopic photograph. It was confirmed by an EDS (electron diffraction spectroscopy) assay attached to TEM (transmission electron microscope) that the layer with a dense color contains a smaller chemical composition of Fe than the layer with a pale color.

While the chemical composition of Fe periodically varies in the direction of thickness in the present invention, such periodic change of the chemical composition of Fe appears as alternately stacked stripes of deep color regions and pale color regions on the transmission electron microscopic photograph.

While it is preferable that the variable region of the chemical composition of Fe with a difference of 4% by mass or more is formed in the entire lower magnetic pole layer 19 and/or upper magnetic pole layer 21, an effect for reducing the coercive force Hc may be obtained by forming the variable region in a part of the layers. It seems to be particularly effective to form the variable region in the vicinity of the gap layer 20.

The periodic variable region of the chemical composition of Fe may be optionally formed in the entire lower magnetic pole layer 19 and/or upper magnetic pole layer 21. Since the periodic variation tends to be disturbed in the vicinity of the lower faces of the upper magnetic pole layer 21 and lower magnetic pole layer 19 in relation to the layers formed under these layers, the periodic variation region may be formed in a part of the lower magnetic pole layer 19 and/or the upper magnetic pole layer 21.

The materials to be used in the present invention will be described below. It is preferable in the present invention to use the NiFe based alloy for forming the soft magnetic film constituting the upper magnetic pole layer 21 and/or the lower magnetic pole layer 19.

The mean chemical composition of Fe in the alloy is preferably 65% by mass or more and 85% by mass or less. The saturation magnetic flux density Bs may be larger by increasing the mean chemical composition of Fe, and the NiFe based alloy having the mean chemical composition of Fe in the range as described above can afford 1.8 T or more, preferably 1.9 T or more and more preferably 2.0 T or more of the saturation magnetic flux density Bs.

It is also preferable in the present invention to use the CoFe based alloy for forming the soft magnetic film. The mean chemical composition of Fe in the alloy is preferably 60% by mass or more and 80% by mass or less. The CoFe based alloy having the mean chemical composition of Fe in the range as described above can afford 2.0 T or more, more preferably 2.2 T or more of the saturation magnetic flux density Bs.

It is further preferable in the present invention that the CoFeNi based alloy is used for forming the soft magnetic film. The mean chemical composition a of Co is 8% by mass or more and 48% by mass or less, the mean chemical composition b of Fe is 50% by mass or more and 90% by mass or less, and the mean chemical composition c of Ni is 2% by mass or more and 20% by mass or less, and the sum of the mean chemical composition a+b+c accounts for 100% by mass. The mean chemical composition of Fe in the range as described above can afford 2.0 T or more, more preferably 2.2 T or more of the saturation magnetic flux density Bs.

The coercive force Hc may be sufficiently reduced in the present invention by changing the chemical composition of Fe in the direction of thickness as shown in FIG. 3, even when the mean chemical composition of Fe is high, thereby enabling a thin film magnetic head excellent in recording characteristics to be manufactured in order to comply with high density recording in the future.

However, the soft magnetic film is not restricted to the NiFe based alloy, CoFe based alloy and CoFeNi based alloy in the present invention. For example, the effect of the present invention may be attained by using a CoFeX or FeNiX based alloy (X represents at least one of Pd, Ir, Rh, Ru and Pt), or a NiFeS based alloy containing a nonmetallic element such as S.

The soft magnetic film is preferably formed by plating in the present invention. It is possible to properly and readily form a soft magnetic film having a varying chemical composition of Fe in the direction of thickness by electroplating as will be described in the manufacturing method hereinafter. Plating may afford a soft magnetic film having larger thickness to be formed as compared with sputtering.

The crystal structure of the soft magnetic film will be described below. It has been elucidated that the crystal structure tends to be a body-centered cubic structure (bcc structure) by increasing the chemical composition of Fe in the soft magnetic film. On the contrary, the crystal structure tends to be a face-centered cubic structure (fcc structure) by decreasing the chemical composition of Fe.

Figure 4:
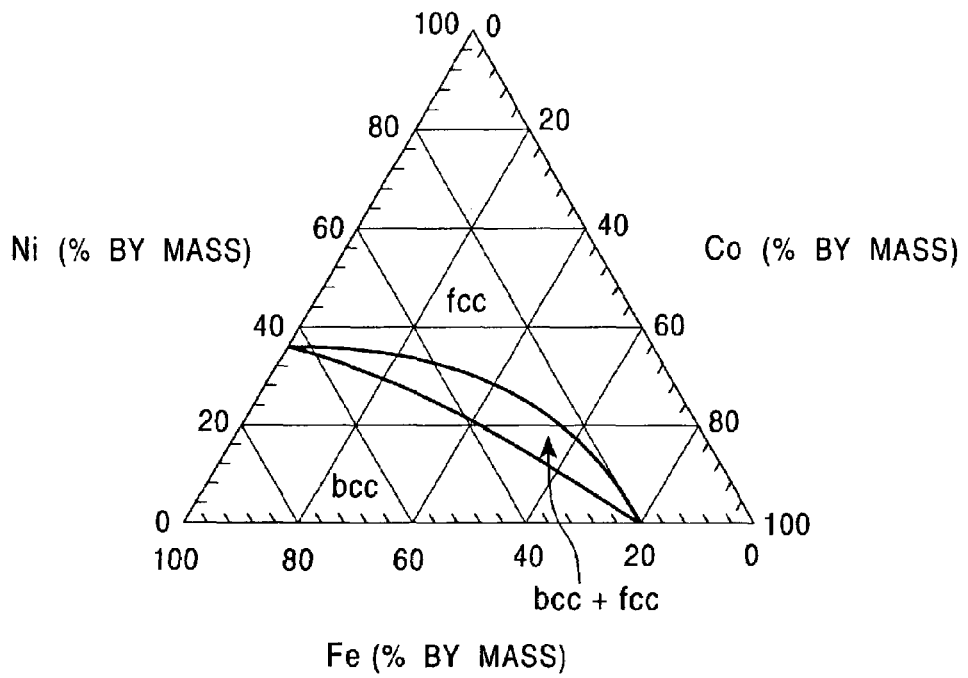
FIG. 4 shows a ternary phase diagram among Fe, Co and Ni for illustrating the relation between the composition and crystal structure when the plating bath contains no sodium saccharin.

FIG. 4 shows a ternary phase diagram among Co, Ni and Fe indicating the relation between proportions of Co, Fe and Ni and crystal structure. The ternary phase diagram was obtained by using no sodium saccharin as a stress relaxation agent in the manufacturing process of the soft magnetic film.

As shown in FIG. 4, the crystal structure tends to take the body-centered cubic structure (bcc structure) when the chemical composition of Fe exceeds 65% by mass. When the chemical composition of Fe is smaller than 65% by mass, on the other hand, the crystal structure tends to be the face-centered cubic structure (fcc structure).

It is preferable in the present invention that the soft magnetic film has a mixed region of the body-centered cubic structure and face-centered cubic structure in at least a part thereof. Such mixed region of different crystal structures permits crystal growth to be more properly inhibited and fine crystal grains to be readily formed. Consequently, the coercive force Hc may be further decreased. The body-centered cubic structure and face-centered cubic structure are simultaneously formed in the region where the chemical composition of Fe is about 65% by mass in the NiFe based alloy. Consequently, the coercive force Hc of the NiFe based alloy may be further decreased.

The chemical composition of Fe changes in the direction of thickness in the present invention. Therefore, a region containing Fe in a proportion of 65% by mass may be formed in the film by forming the film to have a variation of the composition with a deviation of 10% by mass or more from the mean proportion, even when the mean chemical composition of Fe is 75% by mass, making it possible to provide a region in which the body-centered cubic structure and face-centered cubic structure are simultaneously formed in the NiFe based alloy.

Figure 5:
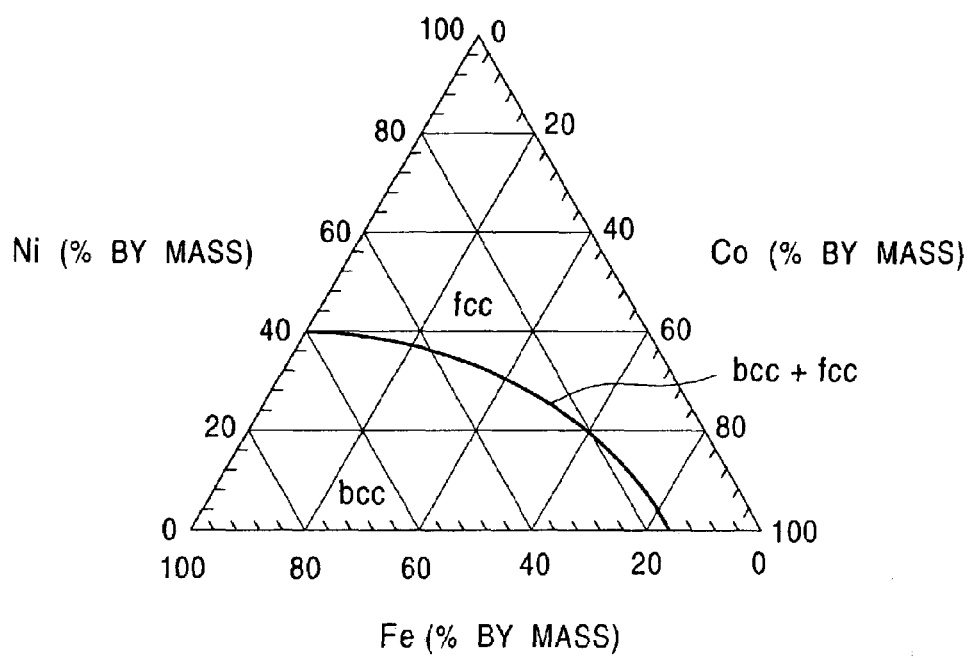
FIG. 5 shows a ternary phase diagram among Fe, Co and Ni for illustrating the relation between the composition and crystal structure when the plating bath contains sodium saccharin.

The ternary phase diagram of Fe, Co and Ni shown in FIG. 5 was obtained by adding sodium saccharin as a stress relaxation agent in the process for manufacturing the soft magnetic film.

As shown in FIG. 5, the crystal structure tend to take the body-centered cubic structure (bcc structure) when the chemical composition of Fe exceeds 60% by mass in the soft magnetic film of, for example, the NiFe based alloy. The crystal structure tends to be the face-centered cubic structure (fcc structure), on the other hand, when the chemical composition of Fe is smaller than 60% by mass. It is preferable to form a region with a chemical composition of Fe of about 60% by mass, in order to form a mixed phase region in which both the body-centered cubic structure and face-centered cubic structure are formed together in at least a part of the soft magnetic film. Decrease of the coercive force of the NiFe based alloy may be enhanced in the region where the face-centered cubic structure and body-centered cubic structure are simultaneously formed.

The effect for reducing the coercive force may be also expected in the soft magnetic films made of an alloy other than the NiFe based alloy, so long as a mixed phase region in which the body-centered cubic structure and face-centered cubic structure are simultaneously formed. As shown in FIG. 4, a region with a mixed phase of the body-centered cubic structure and face-centered cubic structure may be formed in the CoFe based alloy when the proportions of Co and Fe are 80% by mass and 20% by mass, respectively. In the case of the CoFeNi based alloy, on the other hand, a region with a mixed phase of the body-centered cubic structure and face-centered cubic structure may be obtained by selecting a proportion within the region indicated by "bcc+fcc" (including the region on the line) in FIG. 4.

As shown in FIG. 5, a region with a mixed phase of the body-centered cubic structure and face-centered cubic structure may be formed in the CoFe based alloy when the proportions of Co and Fe are 85% by mass and 15% by mass, respectively. In the case of the CoFeNi based alloy, on the other hand, a region with a mixed phase of the body-centered cubic structure and face-centered cubic structure may be obtained by selecting a proportion within the region indicated by "bcc+fcc" (including the region on the line) in FIG. 5.

The crystal grain diameter in the soft magnetic film will be described hereinafter. It is preferable in the present invention to form the film with a crystal grain diameter of 5 nm or more and 20 nm or less. According to the experiments to be described hereinafter, the crystal grain diameter is adjusted to be 5 nm or more and 20 nm or less.

The chemical composition of Fe varies in the direction of thickness in the present invention as hitherto described. The presence of the variable region of the chemical composition of Fe with a difference of variation of 4% or more allows the crystal grains to be properly fine, enabling a crystal grain diameter in the range of 5 nm or more and 20 nm or less to be obtained in the present invention as hitherto described. This grain diameter permits the coercive force to be adequately reduced. It has been experimentally confirmed in the present invention that the coercive force may be reduced to about 79 A/m (=1 Oe) as will be described hereinafter.

The soft magnetic film according to the present invention may be used for the lower core layer 16 and/or upper core layer 22.

The soft magnetic film according to the present invention may be used for thin film magnetic heads other than the thin film magnetic head shown in FIGS. 1 and 2.

Figure 6:
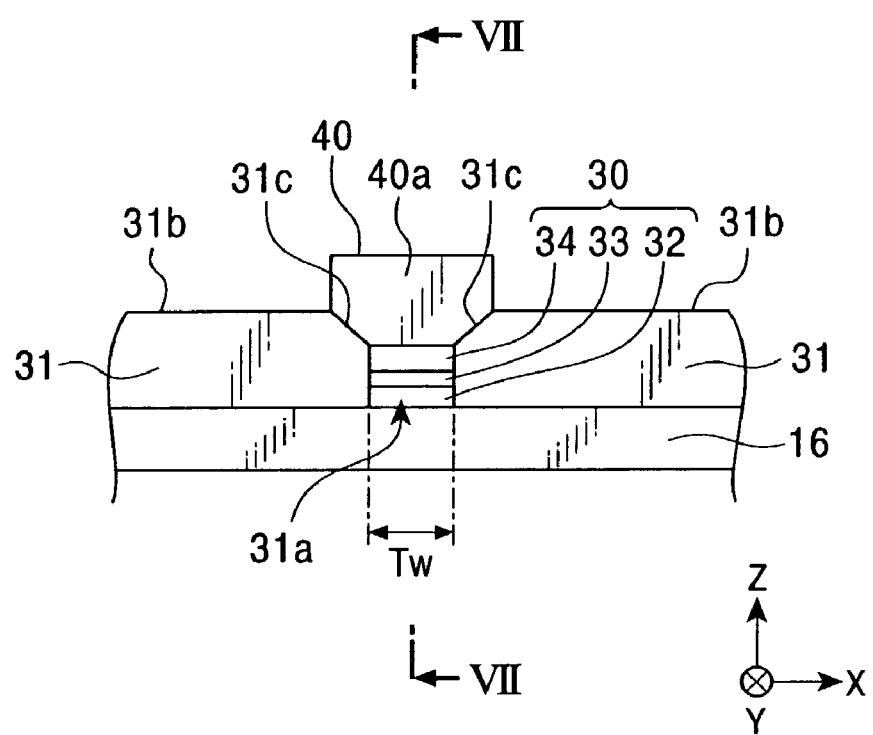
FIG. 6 shows a partial front view of the thin film magnetic head according to the second embodiment of the present invention.
Figure 7:
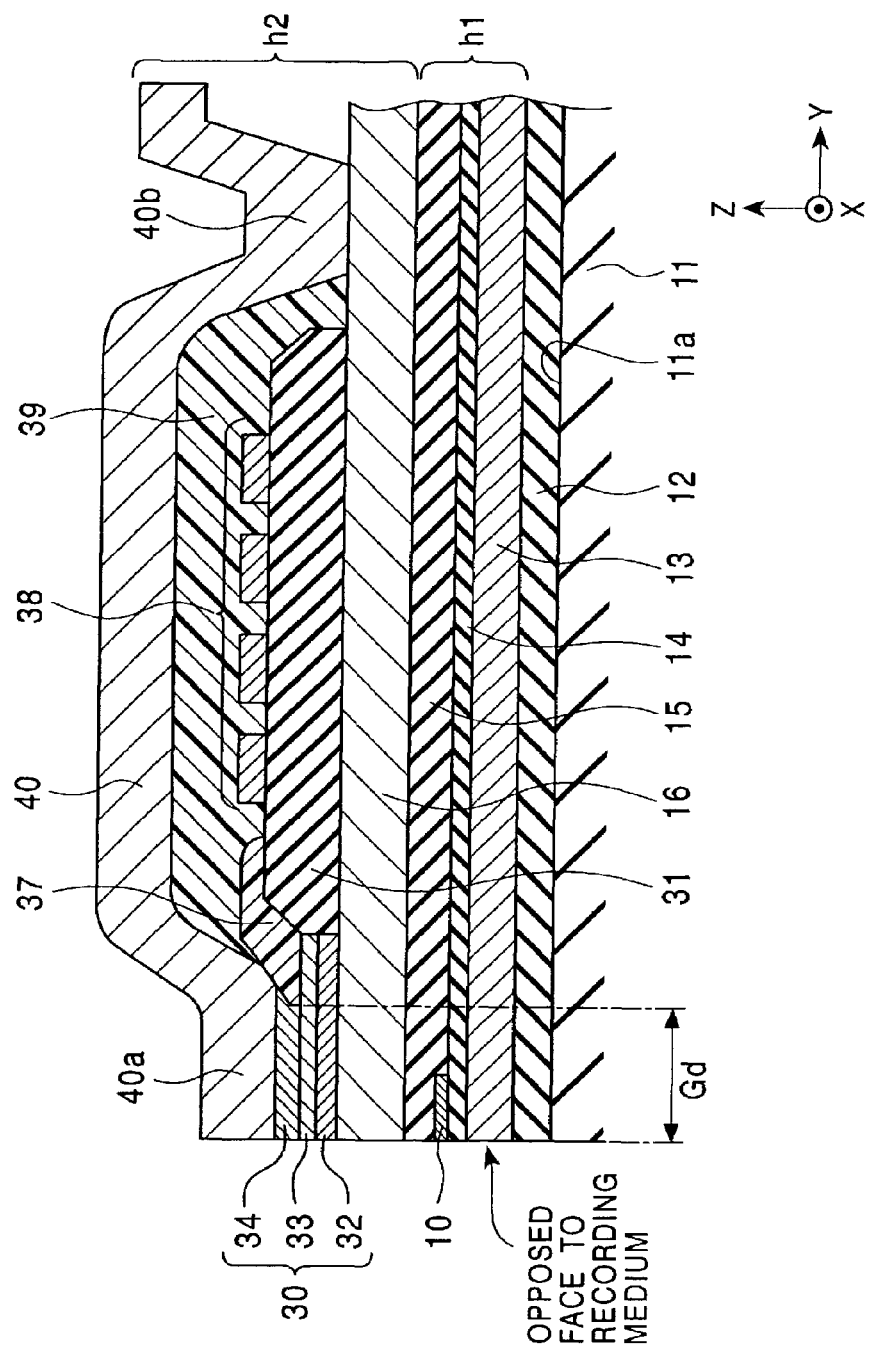
FIG. 7 shows a vertical cross section of the thin film magnetic head shown in FIG. 6.

FIG. 6 is a partial front view showing the structure of the thin film magnetic head according to the second embodiment of the present invention, and FIG. 7 is a partial vertical cross section of the thin film magnetic head cut along the line VII—VII shown in FIG. 6 and viewed from the direction indicated by arrows.

The structure of the MR head h1 in this embodiment is the same as those in FIGS. 1 and 2.

As shown in FIG. 6, an insulation layer 31 is formed on the lower core layer 16. A track width forming groove 31a is formed in the insulation layer 31 with a given length at the back in the height direction (Y-direction) from an opposed face to a recording medium. The track width forming groove 31a is formed with a track with Tw in the opposed face to the recording medium.

A laminated magnetic pole part 30 comprising a lower magnetic pole layer 32, a nonmagnetic gap layer 33 and an upper magnetic pole layer 34 from the bottom in this order is formed in the track width forming grooved 31a.

The lower magnetic pole layer 32 is directly formed on the lower core layer 16 by plating. The gap layer 33 formed on the lower magnetic pole layer 32 is preferably formed of a nonmagnetic metal capable of plating. Preferable examples of the nonmagnetic metal are selected from at least one of NiP, NiPd, NiW, NiMo, Au, Pt, Rh, Pd, Ru and Cr.

A NiP alloy is used for the gap layer 33 in the embodiments according to the present invention, because the gap layer 33 becomes properly nonmagnetic by forming the gap layer 33 with the NiP alloy.

The nonmagnetic part 30 may comprise two layers of the gap layer 33 and upper magnetic pole layer 34.

As shown in FIG. 7, a Gd defining layer 37 is formed on the gap layer 33 from a position with a gap depth (Gd) apart from the recording medium through a position on the insulation layer 31.

The upper magnetic pole layer 34 formed on the gap layer 33 is magnetically coupled with the upper core layer 40 formed thereon.

The lower magnetic pole layer 32, the gap layer 33 and the upper magnetic pole layer 34 may be continuously formed by plating by forming the gap layer 33 with a nonmagnetic metal capable of plating as described above.

As shown in FIG. 7, a coil layer 38 is spirally formed on the insulation layer 31 by patterning. The coil layer 38 is covered with an insulation layer 39 made of an organic insulation material.

As shown in FIG. 6, inclined faces 31c and 31c are formed on both side areas of the track width restricting groove 31a in the track width direction (X-direction), wherein the width between the inclined faces increase in the direction departing from the lower core layer 16 from the upper face of the upper magnetic pole layer 34 through the upper face 31b of the insulation layer 31.

The tip 40a of the upper core layer 40 is formed in the direction departing from the lower core layer 16 from the upper face of the upper magnetic pole layer 34 along the side faces 31c and 31c as shown in FIG. 6.

The upper core layer 40 is formed on the insulation layer 39 from the opposed face to the recording medium in the height direction (Y-direction) as shown in FIG. 7, and the base 40b of the upper core layer 40 are directly formed on the lower core layer 16.

In the second embodiment shown in FIGS. 6 and 7, the lower magnetic pole layer 32 and/or upper magnetic pole layer 34 are formed of soft magnetic films comprising a variable region in which the chemical composition of Fe changes in the direction thickness in at least a part of the film. The difference of the proportions of Fe in the regions most abundant in Fe and most deficient in Fe is 4% by mass or more.

Fine crystal grains are formed in the magnetic pole layers 32 and 34 by forming the magnetic pole layers 32 and 34 using soft magnetic films in which the difference of the proportions of Fe is 4% by mass or more, thereby enabling the coercive force Hc to be reduced as compared with the conventional art.

The saturation magnetic flux density Bs of the magnetic pole layers 32 and 34 may be enhanced by increasing the mean chemical composition of Fe, while a saturation magnetic flux density Bs of 1.8 T or more, preferably 1.9 T or more, more preferably 2.0 T or more, and further preferably 2.2 T or more may be obtained by properly selecting the material of the soft magnetic film and the mean chemical composition of Fe in the present invention.

Since a higher saturation magnetic flux density Bs as compared with that in the conventional art can be obtained while reducing the coercive force in the present invention, it is possible to manufacture a thin film magnetic head that can properly comply with high density recording in the future.

The chemical composition of Fe in the soft magnetic film constituting the magnetic pole layers 32 and 34 periodically changes in the present invention. The length of one cycle is preferably 10 nm or more and 150 nm or less. This periodic distribution of Fe permits fine crystal grains to be formed to enable the coercive force Hc to be more decreased.

The material, proportion, crystal grain diameter and crystal structure of the magnetic pole layer 32 and 34 are the same as those in the soft magnetic film described in FIGS. 1 and 2.

The soft magnetic film described in the present invention may be also used for the lower core layer 16 and/or upper core layer 40.

Figure 8:
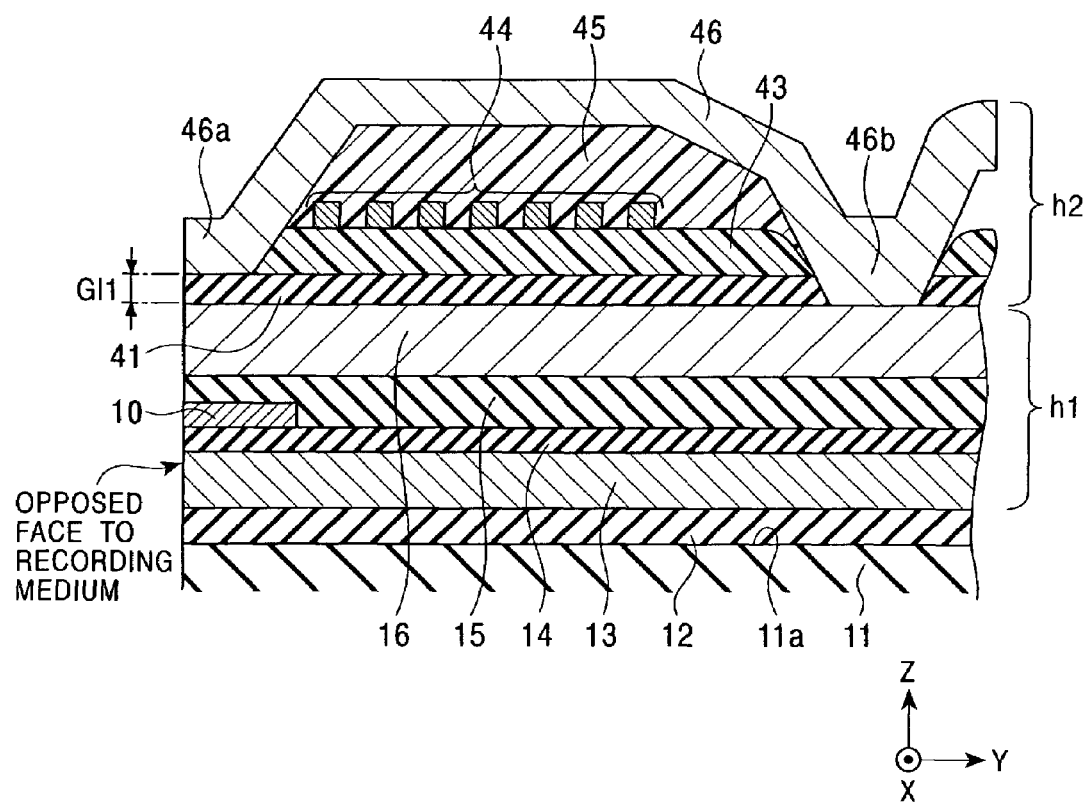
FIG. 8 shows a vertical cross section of the thin film magnetic head according to the third embodiment of the present invention.

FIG. 8 shows a vertical cross section of the thin film magnetic head according to the third embodiment of the present invention.

The MR head h1 in this embodiment is the same as that in FIG. 1. As shown in FIG. 8, a magnetic gap layer (a nonmagnetic material layer) 41 made of alumina is formed on the lower core layer 16. In addition, a coil layer 44 is formed on the magnetic gap layer 41 with an insulation layer 43 made of polyimide or a resist material formed thereon, and the coil layer is spirally patterned. The coil layer 44 is formed of a nonmagnetic conductive material having a low electrical resistance such as Cu (copper).

The coil layer 44 is surrounded by an insulation layer 45 made of polyimide or a resist material, and an upper core layer 46 made of a soft magnetic material is formed on the insulation layer 45.

The tip 46a of the upper core layer 46 faces the lower core layer 16 with interposition of the magnetic gap layer 41 therebetween at the opposed face to the recording medium to form a magnetic gap with a magnetic gap length of $G1_1$. The base 46b of the upper core layer 46 is magnetically coupled with the lower core layer 16 as shown in FIG. 7.

At least a part of the lower core layer 16 and/or upper core layer 46 are formed of a soft magnetic film comprising a variable region in which the chemical composition of Fe varies in the direction of thickness. The difference of proportions of Fe between the regions most abundant in Fe and most deficient in Fe is 4% by mass or more.

Fine crystal grains may be formed in the core layers 16 and 46 with lower coercive force Hc as compared with that in the conventional art, by forming the core layers 16 and 46 using the soft magnetic film comprising the variable region in which the difference of variation in the chemical composition of Fe is 4% by mass or more.

The saturation magnetic flux density Bs of the core layers 16 and 46 may be enhanced by increasing the mean chemical composition of Fe. According to the present invention, 1.8 T or more, preferably 1.9 T or more, more preferably 2.0 T or more, and further preferably 2.2 T or more of the saturation magnetic flux density Bs may be obtained by properly selecting the material of the soft magnetic film and mean chemical composition of Fe.

Since a high saturation magnetic flux density as well as a low coercive force Hc may be obtained in the present invention as compared with the conventional art, it is possible to manufacture a thin film magnetic element capable of complying with high density recording in the future.

The chemical composition of Fe in the soft magnetic film constituting the core layer 16 and 46 periodically changes in the direction of thickness in the present invention with a preferable length of one cycle of 10 nm or more and 150 nm or less. This variation of composition permits fine crystal grains to be formed in the soft magnetic film to enable the coercive force Hc to be further reduced.

The material, proportion, crystal grain diameter and crystal structure in the soft magnetic film constituting the core layers 16 and 46 are the same as those in the soft magnetic film described in FIGS. 1 and 2.

Figure 9:
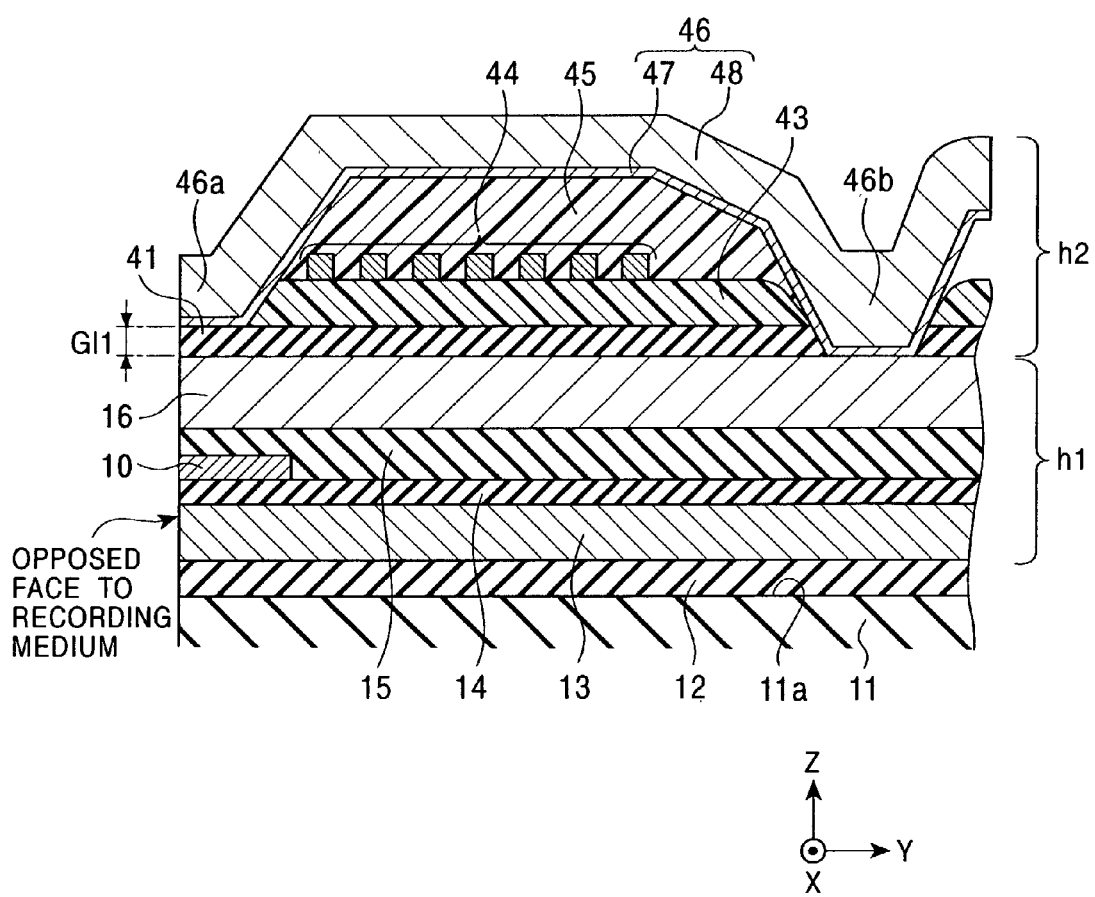
FIG. 9 shows a vertical cross section of the thin film magnetic head according to the fourth embodiment of the present invention.

FIG. 9 shows a vertical cross section of the thin film magnetic head according to the fourth embodiment of the present invention.

The thin film magnetic head in FIG. 9 differs from that in FIG. 8 in that the upper core layer 46 comprises a laminate of two magnetic layers in the thin film magnetic head shown in FIG. 9.

The upper core layer 46 comprises a high Bs layer 47 having a high saturation magnetic flux density Bs and an upper layer 48 laminated thereon.

The high Bs layer 47 is formed of a soft magnetic film comprising a variable region in which the chemical composition of Fe changes in the direction of thickness in at least a part of the film. The difference of the proportions of Fe between the regions most abundant in Fe and most deficient in Fe is 4% by mass or more.

Fine crystal grains may be formed while decreasing the coercive force Hc by forming the high Bs layer 47 using the soft magnetic film having a difference of variation in the chemical composition of Fe is 4% by mass or more.

On the other hand, increasing the chemical composition of Fe enables the saturation magnetic flux density Bs to be increased. According to the present invention, 1.8 T or more, preferably 1.9 T or more, more preferably 2.0 T or more, and further preferably 2.2 T or more of the saturation magnetic flux density Bs may be obtained by properly selecting the material and mean chemical composition of Fe in the soft magnetic film.

Since the saturation magnetic flux density Bs may be made high while decreasing the coercive force Hc in the present invention as compared with the conventional art, it is possible to manufacture a thin film magnetic head capable of properly complying with high density recording in the future.

The chemical composition of Fe in the soft magnetic film constituting the high Bs layer 47 periodically changes in the direction of thickness in the present invention with a preferable length of one cycle of 10 nm or more and 150 nm or less. This film structure permits fine crystal grains to be formed in the soft magnetic film while further decreasing the coercive force Hc.

The material, proportion, crystal grain diameter and crystal structure in the soft magnetic film constituting the high Bs layer 47 are the same as those in the soft magnetic film described in FIGS. 1 and 2.

Although the upper layer 48 constituting the upper core layer 46 has a lower saturation magnetic flux density Bs as compared with that in the high Bs layer 47, resistivity of the upper layer is adjusted to be higher in the upper layer than in the high Bs layer 47. The upper layer 48 comprises, for example, a NiFe alloy, and the chemical composition of Fe in the upper layer 48 is preferably lower than the chemical composition of Fe in the high Bs layer 47. These proportions permit the high Bs layer 47 to have a higher saturation magnetic flux density Bs than the upper layer 48, thereby enabling resolution of recording to be improved by concentrating the magnetic flux in the vicinity of the gap. The upper layer is not always required to be formed of the NiFe alloy, and it may be formed of, for example, a CoFe alloy or CoFeNi alloy. However, it is preferable that the proportion of the soft magnetic material for forming the upper layer is properly adjusted so that the saturation magnetic flux density Bs of the high Bs layer 47 become higher than that in the upper layer 48.

Providing the high resistivity upper layer 48 in the upper core layer 46 allows eddy current loss generated by increasing recording frequencies to be reduced, thereby making it possible to manufacture a thin film magnetic head capable of complying with high recording frequency in the future.

It is preferable to form the high Bs layer 47 at the lower layer side facing the gap layer 41. The high Bs layer 47 may be formed only under the tip 46a of the upper core layer 46 in direct contact with the gap layer 41.

The lower core layer 16 may comprise two layers of the high Bs layer and high resistivity layer. The high Bs layer is laminated on the high resistivity layer in this structure, and the high Bs layer faces the upper core layer 46 with interposition of the gap layer 41.

While the upper core layer 46 has a two layer laminated structure in the embodiment shown in FIG. 9, it may comprise three or more layers. The high Bs layer 47 preferably formed at the side in contact with the gap layer 41 in this structure.

The lower core layer 16 or the upper layer 48 of the upper core layer 46 may be formed of the soft magnetic film according to the present invention.

Figure 10:
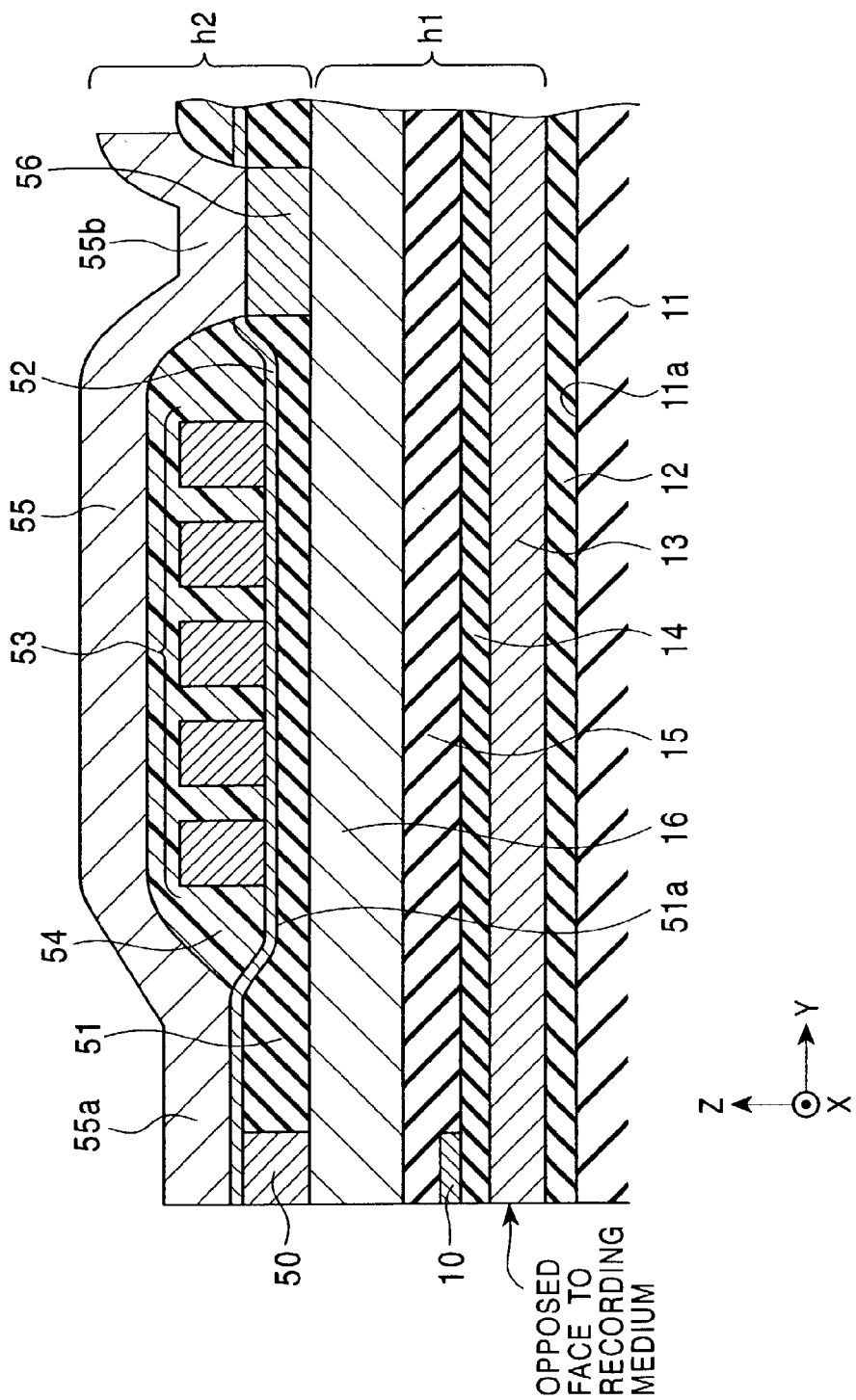
FIG. 10 shows a vertical cross section of the thin film magnetic head according to the fifth embodiment of the present invention.

FIG. 10 shows a vertical cross section of the thin film magnetic head according to the fifth embodiment of the present invention.

The construction of the MR head h1 in the embodiment shown in FIG. 10 is the same as that shown in FIG. 1. A lower magnetic pole layer 50 is formed on the lower core layer 16 so as to raise from the opposed face to the recording medium as shown in FIG. 10. An insulation layer 51 is formed at the back of the lower magnetic pole layer 50 in the height direction (Y-direction). The upper face of the insulation layer 51 is depressed, and a coil forming face 51a is formed therein.

A gap layer 52 is formed from on the lower magnetic pole layer 50 through on the insulation layer 51. A coil layer 53 is further formed on the coil forming face 51a of the insulation layer 51 with interposition of the gap layer 52. The coil layer 53 is covered with an insulation layer 54 made of an organic insulation material.

As shown in FIG. 10, the upper core layer 55 is formed by patterning from on the gap layer 52 through on the insulation layer 54 by frame plating.

The tip 55a of the upper core layer 55 is formed on the gap layer 52 to face the lower core layer 50. The base 55b of the upper core layer 55 is magnetically coupled with the lower core layer 16 with interposition of a lift-up layer 56 formed on the lower core layer 16.

The upper core layer 55 and/or the lower core layer 50 is formed of a soft magnetic film comprising a variable region in which the chemical composition of Fe varies in the direction of thickness in at least a part of the film. The difference of the proportions of Fe in the regions most abundant in Fe and most deficient in Fe is 4% by weight in the variable region.

Fine crystal grains may be formed in the upper core layer 55 and/or lower core layer 50, thereby to decrease the coercive force Hc as compared with that in the conventional art, by forming the upper core layer 55 and/or lower core layer 50 using the soft magnetic film in which the difference of variation of the proportion is 4% by mass or more.

The saturation magnetic flux density Bs of the upper core layer 55 and/or the lower core layer 50 may be enhanced, on the other hand, by increasing the mean chemical composition of Fe. According to the present invention, 1.8 T or more, preferably 1.9 T or more, more preferably 2.0 T or more, and further preferably 2.2 T or more of the saturation magnetic flux density Bs can be obtained by properly selecting the material of the soft magnetic film and by properly setting the mean chemical composition of Fe.

Since the saturation magnetic flux density Bs may be increased while decreasing the coercive force in the present invention as compared with the conventional art, it is possible to manufacture a thin film magnetic element capable of complying with high density recording in the future.

The chemical composition of Fe of the soft magnetic film constituting the upper core layer 55 and/or the lower core layer 50 periodically changes in the direction of thickness in the present invention. The length of one cycle is preferably 10 nm or more and 150 nm or more. This periodic composition allows fine crystal grains to be formed in the soft magnetic film while further decreasing the coercive force Hc.

The material, composition, crystal grain diameter and crystal structure of the soft magnetic film constituting the upper core layer 55 and/or the lower core layer 50 are the same as those described in FIGS. 1 and 2.

The magnetic flux can be concentrated in the vicinity of the gap to improve the recording density, by forming the lower magnetic pole layer 50 as shown in FIG. 10, and by forming the lower magnetic pole layer 50 with the soft magnetic film having a higher saturation magnetic flux density Bs than the lower core layer 16.

The upper core layer 55 has a laminated structure of two or more magnetic layers as the upper core layer in FIG. 9, and the side of the upper core layer facing the gap layer 52 may be formed of a high Bs layer. It is preferable for allowing the magnetic flux to be concentrated in the vicinity of the gap to improve recording density that only the tip 55a of the upper core layer 55 is formed with a laminated structure comprising two or more magnetic layers, and the high Bs layer is formed in contact with the gap layer 52.

Although the layer denoted by the reference numeral 16 serves both as a lower core layer and upper shield layer, the lower core layer and upper shield layer may be formed as independent layers with each other by interposing an insulation layer between them.

The lower core layer 16 may be formed of a soft magnetic film.

General methods for manufacturing the thin film magnetic heads shown in FIGS. 1, 2 and 6 will be described hereinafter.

In the thin magnetic heads shown in FIGS. 1 and 2, the Gd defining layer 17 is formed on the lower core layer 16, followed by forming the magnetic pole part 18, which comprises the lower magnetic pole layer 19, nonmagnetic gap layer 20 and upper magnetic pole layer 21, from the opposed face to the recording medium in the height direction by continuous plating using a resist. Then, after forming the insulation layer 23 at the back of the magnetic pole part 18 in the height direction, the upper face of the magnetic pole part 18 is planarized to be flushed with the upper face of the insulation layer 23 using, for example, a CMP technique. The coil layer 24 is spirally formed on the insulation layer 23, and the insulation layer 25 is formed on the coil layer 24. Subsequently, the upper core layer is formed from on the magnetic pole part 18 through on the insulation layer 25 by, for example, flame plating.

In the thin film magnetic head shown in FIGS. 6 and 7, the insulation layer 31 is formed on the lower core layer 16, followed by forming the track width forming groove 31a from the opposed face of the insulation layer 31 to the recording medium to the backward of the insulation layer in the height direction. Then, the inclined faces 31c and 31c shown in FIG. 6 are formed in the track width forming groove 31a.

The lower magnetic pole layer 32 and nonmagnetic gap layer 33 are formed in the track width forming groove 31a. After forming the Gd defining layer 37 from on the gap layer 33 through on the insulation layer 31, the upper magnetic pole layer 34 is formed on the gap layer 33 by plating. Then, the coil layer 38 is spirally formed on the insulation layer 31 by plating, followed by forming the insulation layer 39 on the coil layer 38. Finally, the upper core layer 40 is formed from on the upper magnetic pole layer 34 through on the insulation layer 39 by, for example, flame plating.

In the thin film magnetic head shown in FIGS. 8 and 9, the gap layer 41 is formed on the lower core layer 16 followed by forming the insulation layer 43, and the coil layer 44 on the insulation layer 43 by patterning. Then, the insulation layer 45 is formed on the coil layer 44, and the upper core layer 46 is patterned from on the gap layer 41 through the insulation layer 45 by flame plating.

In the thin film magnetic head shown in FIG. 10, the lower magnetic pole layer 50 is formed on the lower core layer 16 using a resist, and the insulation layer 51 is formed at the back of the lower magnetic pole layer 50 in the height direction. After planarizing the surfaces of the lower magnetic pole layer 50 and insulation layer 51 using a CMP technology, a coil forming face 51a with a concave surface is formed on the surface of the insulation layer 51. Subsequently, after forming the gap layer 52 from on the lower magnetic pole layer 50 through on the insulation layer 51, the coil layer 53 is spirally formed on the gap layer 52 by patterning followed by forming the insulation layer 54 on the coil layer 53. Finally, the upper core layer 55 is patterned from on the gap layer 52 through on the insulation layer 54 by plating.

The method for producing the soft magnetic film according to the present invention will be described hereinafter. The soft magnetic film in the present invention comprises Fe and magnetic elements other than Fe. A NiFe based alloy, CoFe based alloy and CoFeNi based alloy are included in the examples of the soft magnetic material.

The soft magnetic film is formed by electroplating, for example electroplating using a pulse current, in the present invention. ON/OFF control of an electric current regulator element is repeated in the electroplating method using the pulse current to provide a time interval for flowing an electric current and a void time interval when no electric current flows. The soft magnetic film is plated little by little by providing a time interval with no current flow, which enables uneven distribution of current density to be relaxed during plating as compared with that attained by using a direct current, even when the concentration of Fe in the plating bath is increased.

It is preferable that the ON/OFF control of the pulse current is repeated with a cycle of, for example, several seconds with a duty in the range of 0.1 to 0.5. The pulse current conditions may affect the mean crystal grain size and mean roughness Ra along the center line of the soft magnetic film.

Since uneven distribution of the current density during plating may be relaxed in the electroplating method using the pulse current, it becomes possible to increase the chemical composition of Fe in the soft magnetic film as compared with an electroplating method using a direct current.

Figure 11:
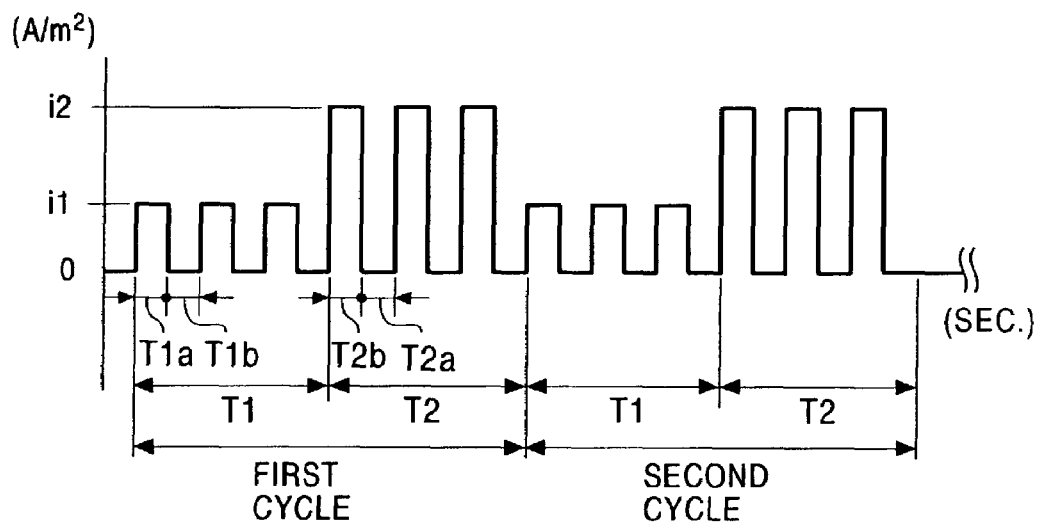
FIG. 11 is a diagram showing timing of a pulse current when the soft magnetic film according to the present invention is formed by electroplating using the pulse current.

The current density of the applied electric current is periodically changed in the present invention in electroplating with the pulse current. FIG. 11 is a pulse current diagram in the present invention.

In FIG. 11, "i1" denotes the current density (electric current density) in ON interval of the current, "T1a (sec)" denotes the ON time interval, "T1b (second)" denotes the OFF time interval, and the pulse current flows for a time interval of "T1". Then, another pulse current is allowed to flow for a time interval of "T2 (second)" with a current density "i2" that is larger than "i1", ON time interval of T2a and OFF time interval of T2b.

A variable region in which the chemical composition of Fe changes in the direction of thickness is formed in the soft magnetic film, by alternately flowing a pulse current with a high current density "i2" and a pulse current with a low current density "i1" with a periodic repetition as shown in FIG. 11. The magnitude of the current density is adjusted so that the difference of the proportions of Fe in the areas most abundant in Fe and most deficient in Fe becomes 4% by weight or more in the present invention.

The chemical composition of Fe becomes large by increasing the current density, while the chemical composition of Fe becomes small by decreasing the current density during electroplating. Accordingly, the difference of variation of the chemical composition of Fe may be increased in the soft magnetic film by making the difference between the high current density "i2" and low current density "i1" shown in FIG. 11 large, thereby enabling the variation difference to be 4% by weight or more.

The variation difference is preferably 6% by mass or more, more preferably 8% by mass or more, and further preferably 10% by mass or more in the present invention. Accordingly, it is preferable to control the magnitude of the high current density "i2" and low current density "i1" during plating so as to obtain a large variation difference. Making the variation difference of the chemical composition of Fe large enables fine crystal grains to be formed in the soft magnetic film while further decreasing the coercive force Hc.

In FIG. 11, the pulse current is allowed to flow for a time interval "T1" with a low current density "i1", followed by flowing a pulse current for a time interval "T2" with a high current density "i2". This cycle is periodically repeated. Such periodic change of the pulse current for a prescribed time interval permits the chemical composition of Fe to be periodically changed in the direction of thickness in electroplating of the soft magnetic film as shown in FIG. 3. It was shown in the present invention that fine crystal grains are more properly formed while further decreasing the coercive force Hc by adjusting the length of one cycle of the chemical composition of Fe to be 10 nm or more and 150 nm or less. Accordingly, it is preferable to control the time intervals T1 and T2 shown in FIG. 11 so as to attain the length of 10 nm or more and 150 nm or less for one cycle of the chemical composition of Fe. The length of one cycle becomes longer as the combined time interval of T1 and T2 is longer, and the length of one cycle becomes shorter, on the contrary, as the combined time interval of T1 and t2 is shorter.

It is also preferable in the present invention to properly adjust the combined plating time interval of T1 and T2, so that the length of one cycle becomes 100 nm or less.

While the pulse conditions (the current density and current flow time) in the first cycle and second cycle, and the pulse conditions in the cycles thereafter, are set to be the same with each other in FIG. 11, the condition may be different in each cycle. The variation differences of the chemical composition of Fe may be changed, or the length of one cycle may be varied at any number of cycles by changing the pulse conditions for producing the soft magnetic film.

A pulse current with a low current density "i1" is allowed to flow at first, followed by flowing a pulse current with a high current density "i2" in FIG. 11. However, it is needless to say that, on the contrary, a pulse current with a high current density "i2" may be allowed to flow at first, followed flowing a pulse current with a low current density "i1". This pulse conditions are also periodically repeated.

A direct current may be used for electroplating in the present invention, in place of using a pulse current. As shown in the timing diagram in FIG. 12, a direct current with a current density of "i3" is allowed to flow for a time interval of T3, followed by increasing the current density to "i4" to flow the direct current for a time interval of T4. This current configuration also enables the variation difference of the chemical composition of Fe to be 4% by mass or more in the direction of thickness, thereby enabling a soft magnetic film to be produced with a periodic change of the chemical composition of Fe in the direction of thickness.

Figure 12:
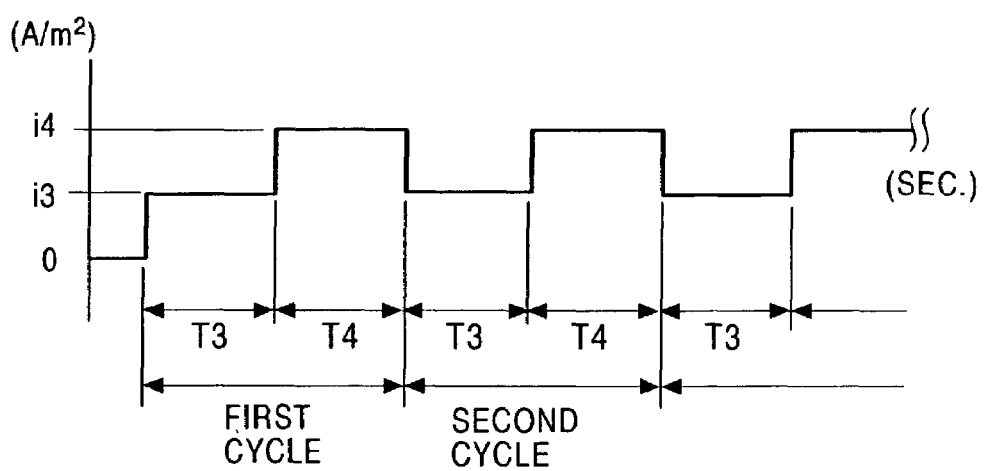
FIG. 12 is a diagram showing timing of a direct current when the soft magnetic film according to the present invention is formed by electroplating using the direct current.

While the current conditions (current density and current flow time interval) are set to be the same in the first cycle and second cycle, and in the cycles thereafter, in FIG. 12 as in FIG. 11, the current condition may be different in each cycle. Such change of the current conditions permit the variation width of the chemical composition of Fe, and the length of one cycle to be changed at any cycle in producing the soft magnetic film.

A direct current with a low current density "i3" is allowed to flow at first, followed by flowing a direct current with a high current density "i4" in FIG. 12. However, it is needless to say that, on the contrary, a direct current with a high current density "i4" may be allowed to flow at first, followed flowing a direct current with a low current density "i3". This pulse conditions are also periodically repeated.

The electroplating method using the pulse current as shown in FIG. 11 is desirably employed in plating the soft magnetic film made of the NiFe based alloy. The electroplating method using the direct current as shown in FIG. 12 is preferably used, on the other hand, in plating the soft magnetic film made of the CoFeNi based alloy.

The soft magnetic film is preferably formed of a NiFe based alloy in the present invention with a preferable mean chemical composition of Fe of 65% by mass or more and 85% by mass or less.

It is preferable for decreasing the mean chemical composition of Fe to decrease the Ni ion concentration in the plating bath.

Decreasing the Ni ion concentration permits the amount of the Ni ion making contact with the surface of the cathode (the side to be plated) to be decreased, thereby enabling large quantity of Fe to be incorporated into the NiFe based alloy as a result of enhanced stirring effect.

The concentration of the Ni ion in the plating bath is adjusted, for example, to 6.6 g/liter or more and 40 g/liter or less with a concentration ratio of the Fe ion to the Ni ion of 0.15 or more and 0.80 or less in the present invention. This concentration ratio permits the soft magnetic film having the mean chemical composition of Fe as described above to be formed by plating.

It is also preferable in the present invention that the soft magnetic film is formed of a CoFe based alloy with a mean chemical composition of Fe of 60% by mass or more and 80% by mass or less.

In one example of the composition of the plating bath, the ratio of the Fe ion composition to the Co ion composition is adjusted to 1.5 or more and 2.5 or less. This concentration ratio permits the chemical composition of Fe in the CoFe based alloy to be set at 60% by mass or more and 80% by mass or less.

It is also preferable in the present invention that the soft magnetic film is formed of a CoFeNi based alloy with 8% by mass or more and 48% by mass or less of the mean chemical composition a of Co, 50% by mass or more and 90% by mass or less of the mean chemical composition b of Fe, and 2% by mass or more and 20% by mass or less of the mean chemical composition c of Ni, wherein the combined mean chemical composition (a+b+c) accounts for 100% by mass.

In one example of the composition of the plating bath, the concentration ratios of (Fe ion/Co ion) and (Fe ion/Ni ion) are 1.5 or more and 2 or more and 4 or less, respectively. These concentration ratios permit the CoFeNi based alloy to be formed by plating with the mean proportions as described above.

Sodium saccharin ($C_6H_4CONNaSO_2$) is preferably added in the plating bath for the soft magnetic film in the present invention. Since sodium saccharin serves as a stress relaxation agent, the stress generated in the film by plating may be decreased.

It is also preferable to add 2-butin-1,4-diol in the plating bath for the soft magnetic film. This compound can suppress crystal grains in the NiFe based alloy from being coarsened while decreasing the coercive force Hc.

It is also preferable in the present invention to add sodium 2-ethylhexyl sulfate in the plating bath for the soft magnetic film.

Sodium 2-ethylhexyl sulfate is a surfactant. Hydrogen generated by plating of the soft magnetic film may be removed and prevented from adhering on the plating film by adding sodium 2-ethylhexyl sulfate. Since hydrogen adhered on the plating film prevents the crystals from being densely grown to cause severe roughening of surface of the film, the surface of the plating film may become smooth by removing hydrogen as described in the present invention to enable the coercive force to be more decreased.

Sodium lauryl sulfate may be added in place of sodium 2-ethylhexyl sulfate described above. However, since sodium lauryl sulfate is liable to foam in the plating bath as compared with sodium 2-ethylhexyl sulfate, it is difficult to add sodium lauryl sulfate in an amount enough for effectively removing hydrogen. Accordingly, It is preferable in the present invention that sodium 2-ethylhexyl sulfate that is less liable to foam than sodium lauryl sulfate is added in an amount enough for effectively removing hydrogen.

Boric acid is also preferably added in the plating bath. Boric acid serves as a pH buffering agent on the surface of the electrode, and is effective for making the plating film lubricant.

The crystal grains in the soft magnetic film are preferably formed with a diameter of 5 nm or more and 20 nm or less in the present invention in order to further decrease the coercive force.

Preferably, the proportion in the soft magnetic film and the current density for electroplating are adjusted so that a mixed phase region of the body-centered cubic structure and face-centered cubic structure is formed in at least a part of the soft magnetic film. As described in FIG. 4 (without sodium saccharin in the plating bath) and FIG. 5 (with sodium saccharin in the plating bath), the proportion of the plating bath and the current density for electroplating are adjusted so that the proportions of Fe, Co and Ni falls on the "bcc+fcc" line or in the "bcc+fcc" region in the ternary phase diagrams in FIGS. 4 and 5. It is possible to further decrease the coercive force Hc in the entire soft magnetic film by allowing the mixed phase of the body-centered cubic structure and body-centered cubic structure to be incorporated in the soft magnetic film.

The magnetic pole layers 19 and 21 or the core layers 16 and 22 shown in FIGS. 1 and 2, the magnetic pole layers 32 and 34 or the core layers 16 and 40 shown in FIGS. 6 and 7, and the magnetic pole layers 16 and 46 shown in FIG. 8, the high Bs layer 47 or lower core layer 16 shown in FIG. 9, and the lower magnetic pole layer 50, upper core layer 55 and lower core layer 16 shown in FIG. 10 are formed by electroplating by the methods as hitherto described to complete the each thin film magnetic head.

The soft magnetic film according to the present invention may be used for the core layers and magnetic pole layers of the recording thin film magnetic head (inductive head) to be integrated into a hard disk device, as well as for various magnetic elements such as an inductor.

EXAMPLE

The NiFe based alloy film is formed on the substrate by electroplating using a pulse current in the present invention, and the relation between the thickness of the NiFe based alloy film and the chemical composition of Fe in the film was investigated.

Four samples of A to D were prepared in the experiment. The composition of the plating bath for plating the four samples were as follows:

| | |
|---|---|
| Fe ion | 5 g/liter |
| Ni ion | 10 g/liter |
| Boric acid | 15 g/liter |
| sodium chloride | 25 g/l |

The temperature of the plating solution was adjusted to 30° C., and pH at the electrode was controlled at 3.5. A Ni electrode was used for the anode electrode.

The sample A was plated in the plating bath as described above in accordance with the timing diagram shown in FIG. 11 using a pulse current under the conditions of i1=5 mA/cm$^2$, i2=20 mA/cm$^2$, T1=40 sec and T2=5 sec.

The sample B was plated in the plating bath as described above in accordance with the timing diagram shown in FIG. 11 using a pulse current under the conditions of i1=5 mA/cm$^2$, i2=20 mA/cm$^2$, T1=80 sec and T2=10 sec.

The sample C was plated in the plating bath as described above in accordance with the timing diagram shown in FIG. 11 using a pulse current under the conditions of i1=5 mA/cm$^2$, i2=20 mA/cm$^2$, T1=160 sec and T2=20 sec.

The sample D was plated in the plating bath as described above using a pulse current with a constant current density of 20 mA/cm$^2$.

Figure 13:
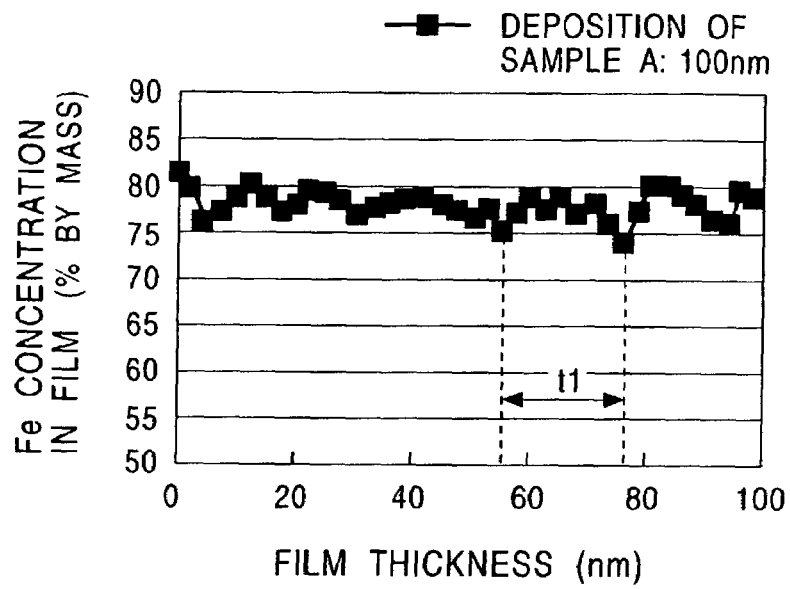
FIG. 13 is a graph showing the relation between the thickness of the NiFe based alloy film and the chemical composition of Fe in the film, wherein the chemical composition of Fe in the NiFe based alloy film is periodically changed with a length of one cycle of about 18 nm (sample A).

FIG. 13 is a graph showing the relation between the thickness of the NiFe based alloy film and the chemical composition of Fe in the film in the sample A. The chemical composition of Fe was measured by EDS analysis attached to TEM, while the thickness was measured with a transmission electron microscope (TEM). A transmission electron microscope JEM 2010 made by Nihon Electronics Co. was used for the TEM measurement, and an EDS analyzer (X-ray analyzer) VANTAGE made by Norlan Co. was used for the EDS assay.

The variation of the chemical composition of Fe in the film from halfway to the surface of the film with a thickness of 100 nm is shown in the graph entitled as "Deposition of Sample: 100 nm" shown in FIG. 13. The title "Deposition of Sample: 100 nm" has similar meanings in FIGS. 14 to 16.

FIG. 13 shows that the chemical composition of Fe in the film surges with an approximately periodical change in the direction of thickness. The length t1 of one cycle was approximately 18 nm. The difference of the proportions of Fe in the portions most abundant in Fe and most deficient in Fe was 4 to 6% by mass as seen in the graph.

Figure 14:
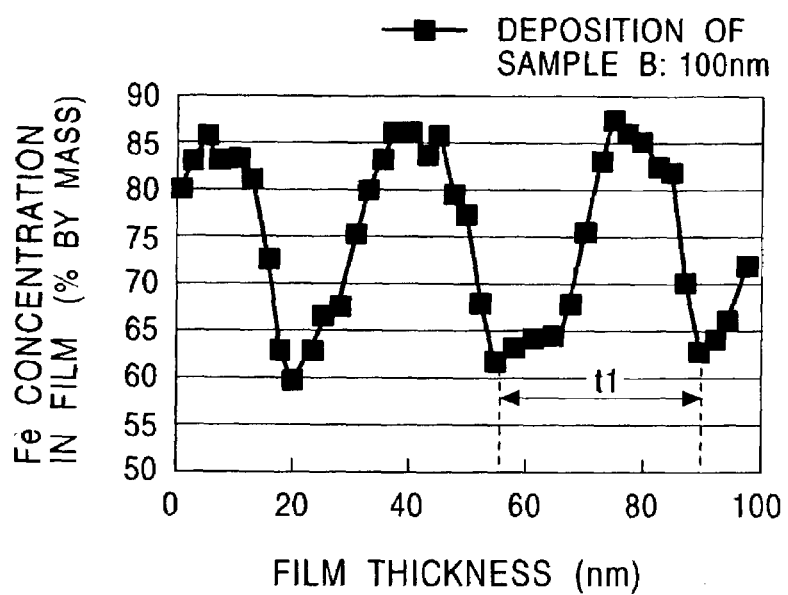
FIG. 14 is a graph showing the relation between the thickness of the NiFe based alloy film and the chemical composition of Fe in the film, wherein the chemical composition of Fe in the NiFe based alloy film is periodically changed with a length of one cycle of about 36 nm (sample B).

FIG. 14 is a graph showing the relation between the thickness of the NiFe based alloy film and the chemical composition of Fe in the film in the sample B.

FIG. 14 shows, as FIG. 13 does, that the chemical composition of Fe in the film surges with an approximately periodical change in the direction of thickness. The length t1 of one cycle was approximately 36 nm. The difference of the proportions of Fe in the portions most abundant in Fe and most deficient in Fe was 26 to 28% by mass as seen in the graph.

Figure 15:
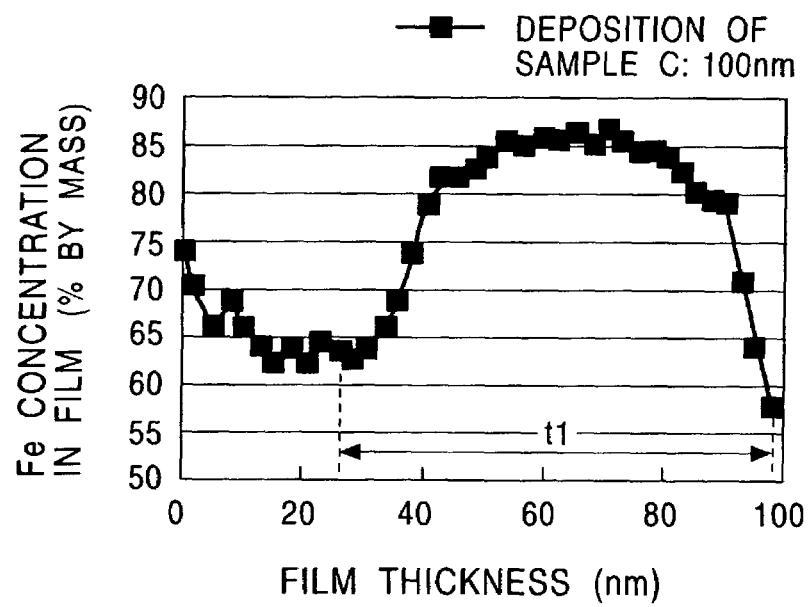
FIG. 15 is a graph showing the relation between the thickness of the NiFe based alloy film and the chemical composition of Fe in the film, wherein the chemical composition of Fe in the NiFe based alloy film is periodically changed with a length of one cycle of about 72 nm (sample C).

FIG. 15 is a graph showing the relation between the thickness of the NiFe based alloy film and the chemical composition of Fe in the film in the sample C.

FIG. 15 shows, as FIGS. 13 and 14 do, that the chemical composition of Fe in the film surges with an approximately periodical change in the direction of thickness. The length t1 of one cycle was approximately 72 nm. The difference of the proportions of Fe in the portions most abundant in Fe and most deficient in Fe was 30 to 31% by mass as seen in the graph.

It was shown that the chemical composition of Fe changes in the direction of thickness in each sample A to C with a periodic change of the chemical composition of Fe in the direction of thickness.

Figure 16:
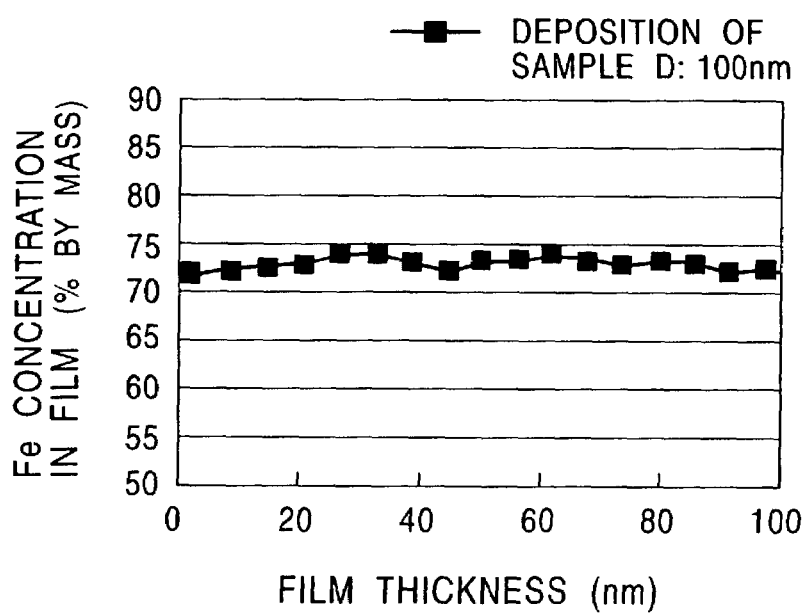
FIG. 16 is a graph showing the relation between the thickness of the NiFe based alloy film and the chemical composition of Fe in the film, when the chemical composition of Fe in the direction of thickness is controlled to be approximately constant (sample D).

While FIG. 16 is a graph showing the relation between the thickness of the NiFe based alloy film and the chemical composition of Fe in the film in the sample D, the graph shows that the chemical composition of Fe show little changes in the direction of thickness, or the chemical composition of Fe remains approximately constant in the direction of thickness. The variation difference of the chemical composition of Fe in the direction of thickness is only 1 to 2% by weight.

It is possible to reduce the coercive force Hc in the NiFe based alloy film by allowing the chemical composition of Fe to change in the direction of thickness as shown in the samples A to C as compared with the sample with no change of the proportion.

Figure 17:
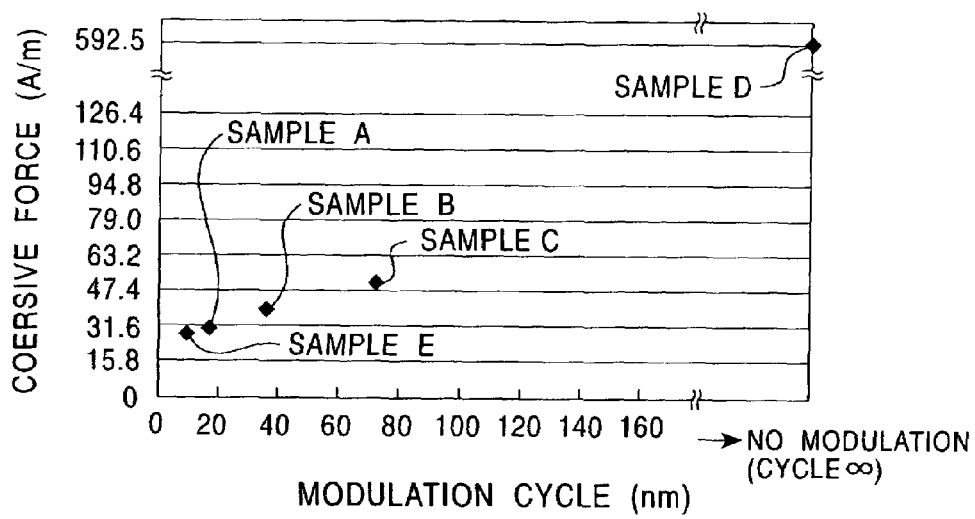
FIG. 17 is a graph showing the relations between the modulation cycle of the chemical composition of Fe in the NiFe based alloy and coercive force Hc in the samples A to D.

FIG. 17 is a graph showing the relation between the variation cycle of the chemical composition of Fe and the coercive force Hc. As shown in FIG. 17, the coercive force Hc is lower than 79 A/m (=1 Oe) in the NiFe based alloy films as the samples A to C in which the proportions of Fe periodically change in the direction of thickness. In the sample D in which the chemical composition of Fe shows little change in the direction of thickness, on the contrary, the coercive force Hc is larger than 79 A/m, showing that the alloy film has a substantially higher Hc than the alloy films as the samples A to C.

Since the difference of the proportions between the portions most abundant in Fe and most deficient in Fe is 4% by mass or more in any one of the samples A to C, the proper variation difference was determined to be 4% by mass or more in the present invention. However, the larger variation difference is more preferable in the present invention. Actually, the variation difference is 10% by mass or more in either the sample B or the sample C, in which the coercive force is smaller than that in the sample D.

In the sample E, the length of one cycle was about 10 nm, and the coercive force Hc was smaller than 79 A/m (=1 Oe).

The preferable length of one cycle of the change of the chemical composition of Fe in the direction of thickness was determined to be 10 nm or more. While each samples A, C or E has a length of one cycle of 10 nm or more, preferable length is 18 nm or more and 150 nm or less, more preferably 100 nm or less, based on the experimental result in the sample A, since the longer length of one cycle permits fine crystal grains to be hardly made formed to make it difficult to reduce the coercive force Hc as shown in FIG. 17. A length of 100 nm or less, more preferably 72 nm or less, permits the coercive force Hc to be 79 A/m (=1 Oe) as shown in FIG. 17 based on the experimental result in the Sample C.

Then, the relation between the mean chemical composition of Fe in the NiFe alloy and magnetic characteristics was investigated.

Figure 18:
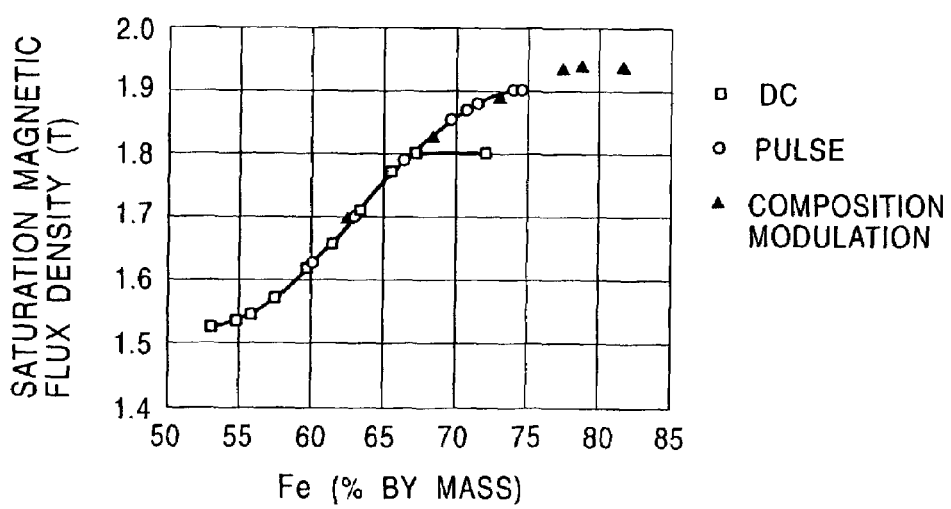
FIG. 18 is a graph showing the relations between the chemical composition of Fe and saturation magnetic flux density Bs when the NiFe based alloy is plated by a direct current with a constant current density, a pulse current with a constant current density, and a pulse current having a periodically varying current density, respectively.

FIG. 18 is a graph showing the relation between the chemical composition of Fe in the NiFe based alloy film and the saturation magnetic flux density. The graph denoted by "DC" in FIG. 18 is an experimental result obtained by plating the NiFe based alloy film using a constant direct current. The graph denoted by "Pulse" in FIG. 18 is an experimental result obtained by plating the NiFe based alloy film using a pulse current with a constant current density. The graphs denoted by "DC" and "Pulse" were provided as comparative examples.

The graph denoted by "Composition Modulation" in FIG. 18 corresponds to the experimental results in which the chemical composition of Fe changes in the direction of thickness as in the samples A to C with a periodic variation of the chemical composition of Fe in the direction of thickness. This graph is presented as the example according to the present invention. The chemical composition of Fe in this example represents a mean proportion. The NiFe alloy film in this example was plated using the pulse current based on the timing diagram shown in FIG. 11.

FIG. 18 shows that the larger chemical composition of Fe makes the saturation magnetic flux density Bs to be larger. As shown in FIG. 18, the saturation magnetic flux density Bs increases to about 1.9 T by increasing the mean chemical composition of Fe to about 73% by mass, and this level of the saturation magnetic flux density is higher than the saturation magnetic flux density in the graph denoted by "DC".

As shown in the graph entitled by "Composition Modulation" in FIG. 18, the saturation magnetic flux density Bs may be increased by increasing the mean chemical composition of Fe, even when the chemical composition of Fe varies in the direction of thickness. It was also shown that the mean chemical composition of Fe can be increased t about 85% by mass in the NiFe based alloy denoted by "Composition Modulation". As shown in FIG. 18, a saturation magnetic flux density Bs of 1.8 T or more could be obtained when the mean chemical composition of Fe is 65% by mass or more. The saturation magnetic flux density Bs of 1.9 T or more, or 1.95 T or more, could be attained by increasing the mean chemical composition of Fe to 75% by mass or more.

Figure 19:
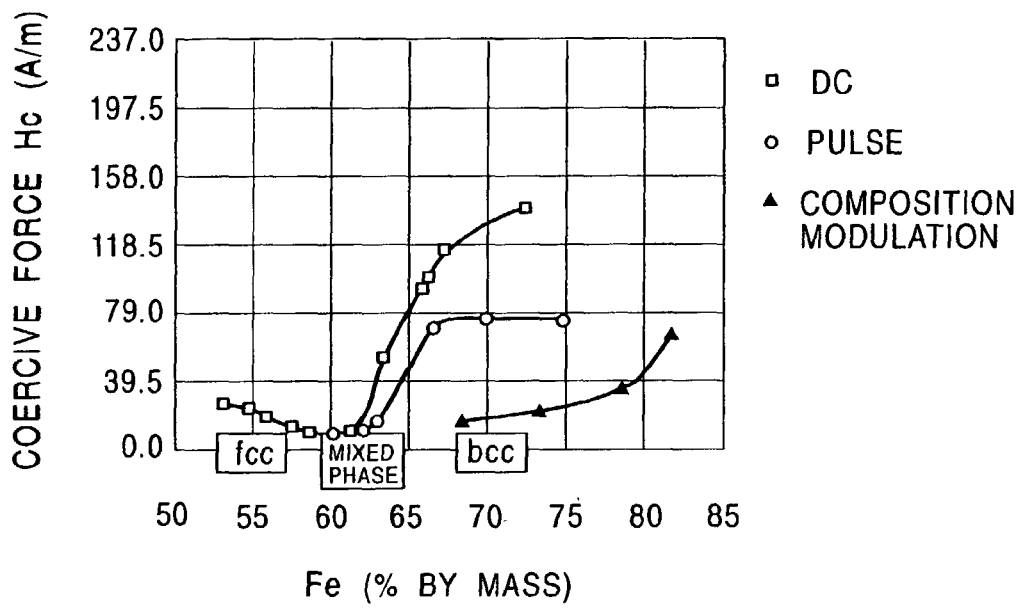
FIG. 19 is a graph showing the relations between the chemical composition of Fe and coercive force Hc when the NiFe based alloy is plated by a direct current with a constant current density, a pulse current with a constant current density, and a pulse current having a periodically varying current density, respectively.

FIG. 19 shows the experimental results on the relation between the chemical composition of Fe in the NiFe based alloy film and the coercive force Hc. The graphs denoted by "DC", "Pulse" and "Composition Modulation" in FIG. 19 have the same meanings as those described in FIG. 18.

FIG. 19 shows that the coercive force exceeds 79 A/m (=1 Oe) or substantially comes close to 79 A/m in the graphs denoted by "DC" and "Pulse" when the chemical composition of Fe is 65% by mass or more.

In the graph denoted by "Composition Modulation", on the contrary, the coercive force is far less than 79 A/m (=1 Oe) even when the mean chemical composition of Fe exceeds 80% by mass, showing that the coercive force Hc could be properly reduced even by increasing the mean chemical composition of Fe as compared with the graphs denoted by "DC" and "Pulse".

It was shown from the experimental results in FIGS. 18 and 19 that the saturation magnetic flux density Bs may be increased by increasing the mean chemical composition of Fe with a sufficiently smaller coercive force Hc as compared with the conventional art, when the chemical composition of Fe periodically changes in the direction of thickness in the soft magnetic film.

Figure 20:
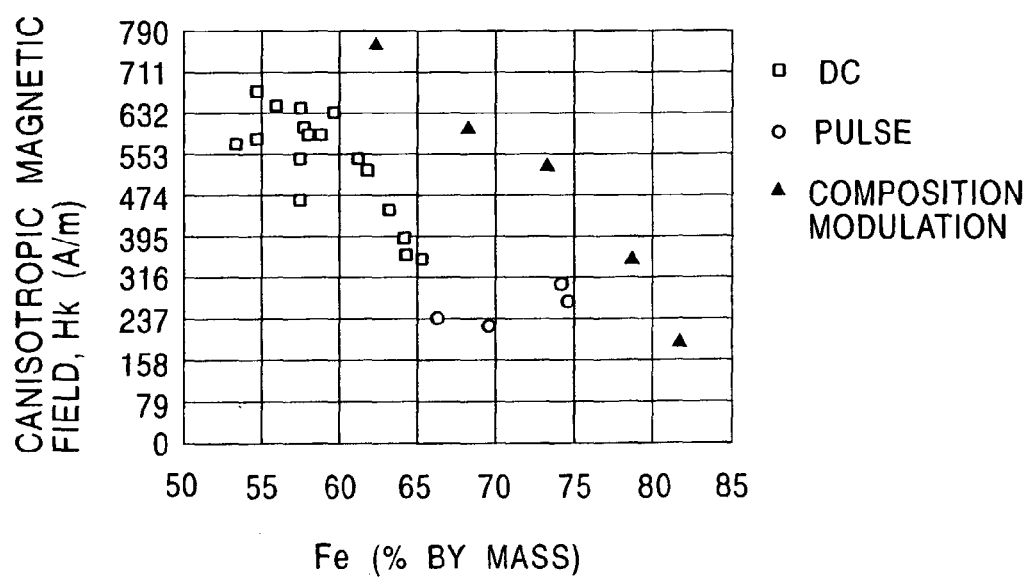
FIG. 20 is a graph showing the relations between the chemical composition of Fe and anisotropic magnetic field Hk when the NiFe based alloy is plated by a direct current with a constant current density, a pulse current with a constant current density, and a pulse current having a periodically varying current density, respectively.

FIG. 20 shows the experimental results on the relation between the chemical composition of Fe in the NiFe based alloy and the anisotropic magnetic field Hk. The graphs denoted by "DC", "Pulse" and "Composition Modulation" in FIG. 20 have the same meanings as those in FIG. 18.

FIG. 20 shows that, different from the graphs denoted by "DC" and "Pulse", a large anisotropic magnetic field Hk could be obtained in the soft magnetic film denoted by the graph "Composition Modulation" even by increasing the chemical composition of Fe.

Cross sections of the NiFe based alloy films in the direction of thickness were observed under a transmission electron microscope with respect to the samples B, C and D.

Figure 21:
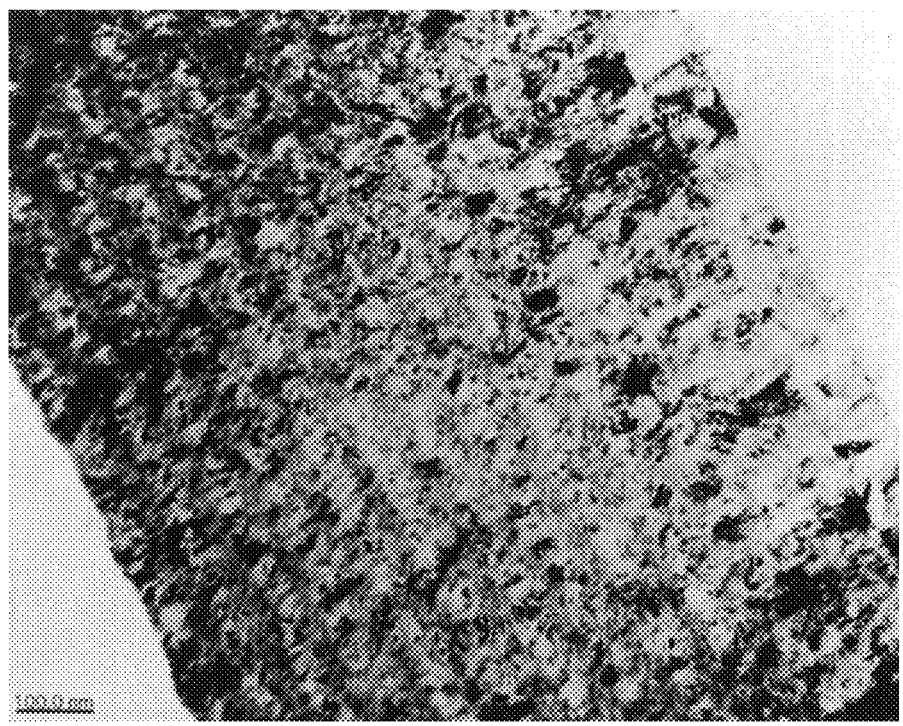
FIG. 21 is a transmission electron microscopic photograph showing the film configuration on the cross section of the NiFe based alloy film (sample C) in the direction of thickness.
Figure 22:
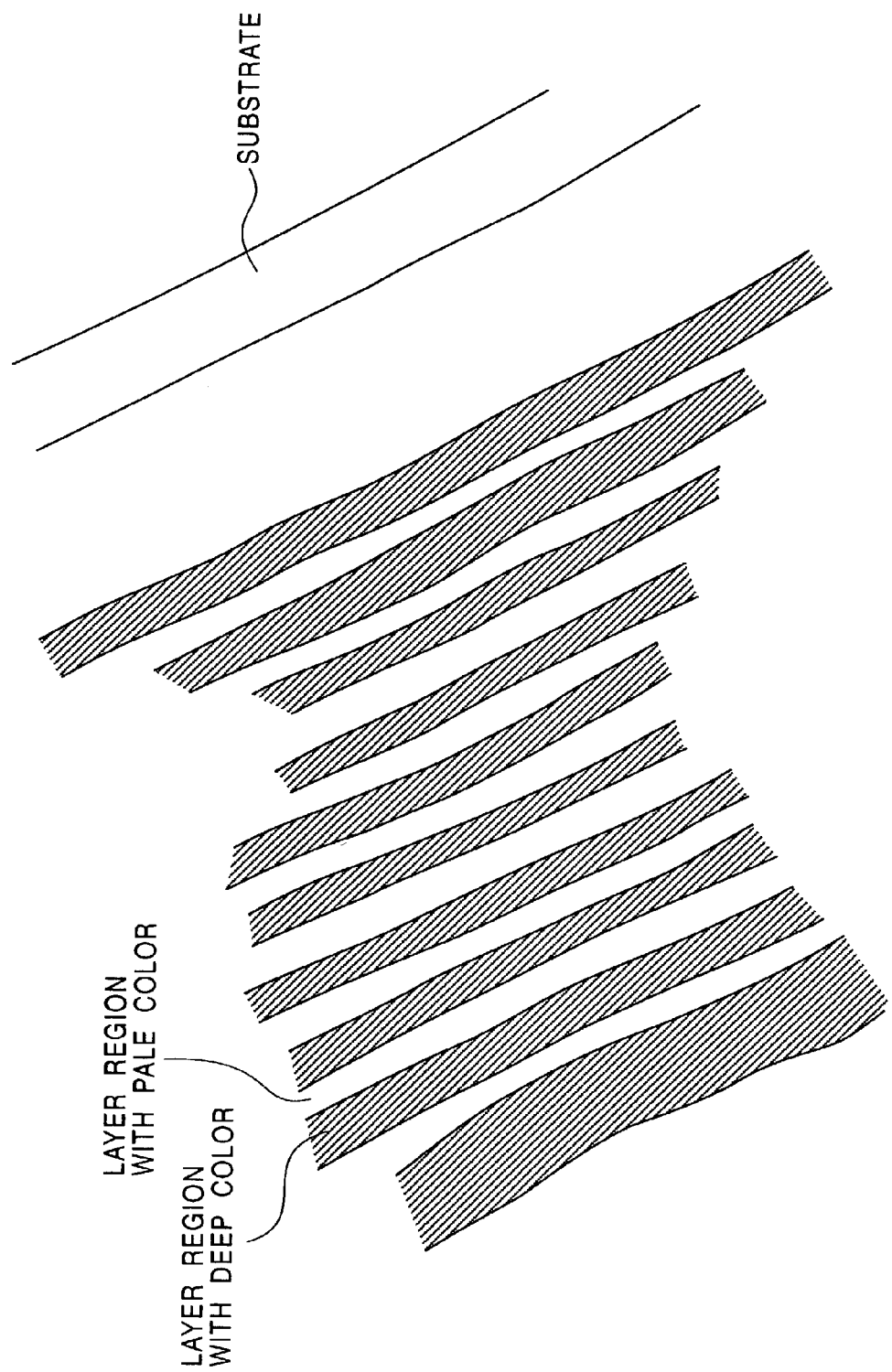
FIG. 22 shows a partially magnified cross section of the film configuration shown in FIG. 21.

FIG. 21 shows a transmission electron microscopic photograph (TEM photograph) of the cross section of the NiFe alloy of the sample C (with a variation cycle of the chemical composition of Fe of about 72 nm) in the direction of thickness, and FIG. 22 illustrates a partially magnified drawing of the transmission electron microscopic photograph shown in FIG. 21.

FIGS. 21 and 22 shows that stripes with a deep color and pale color, each elongating in the direction approximately parallel to the surface of the substrate, are alternately laminated on the cross section of the NiFe based alloy film as the sample C. The layer region with a deep color has a lower chemical composition of Fe than the layer region with a pale color. In other words, layers with a higher chemical composition of Fe and layers with a lower proportion of Fe are alternately laminated in the direction of thickness in the NiFe alloy film as the sample C. No large crystal grains were found on the photograph shown in FIG. 21.

Figure 23:
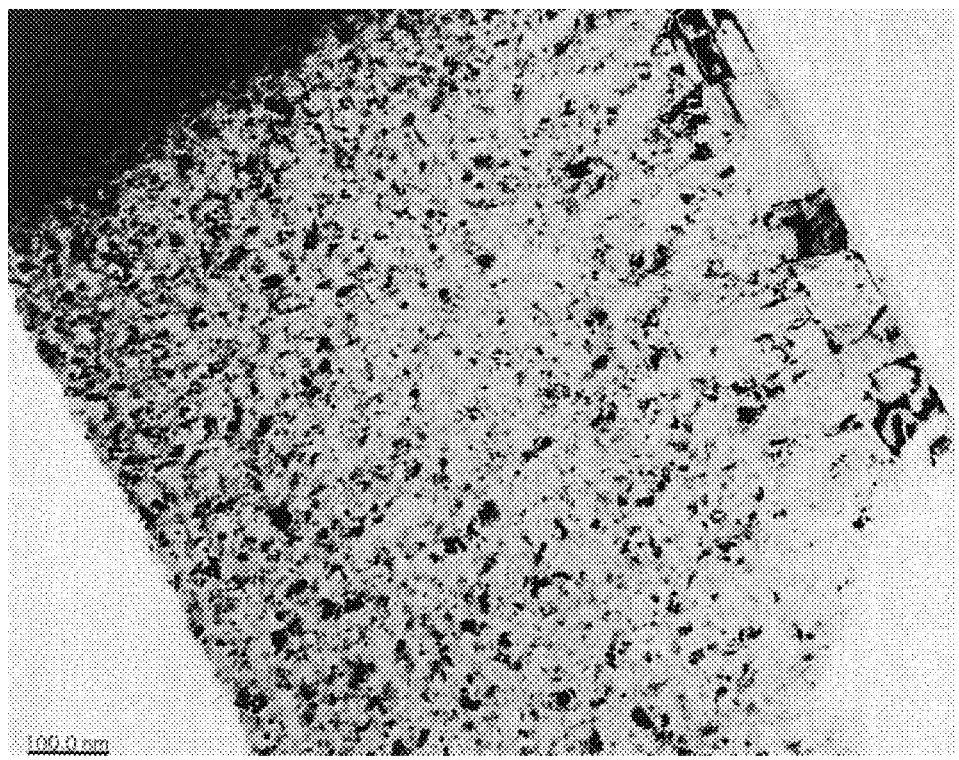
FIG. 23 is a transmission electron microscopic photograph showing the film configuration on the cross section of the NiFe based alloy film (sample C) in the direction of thickness.
Figure 24:
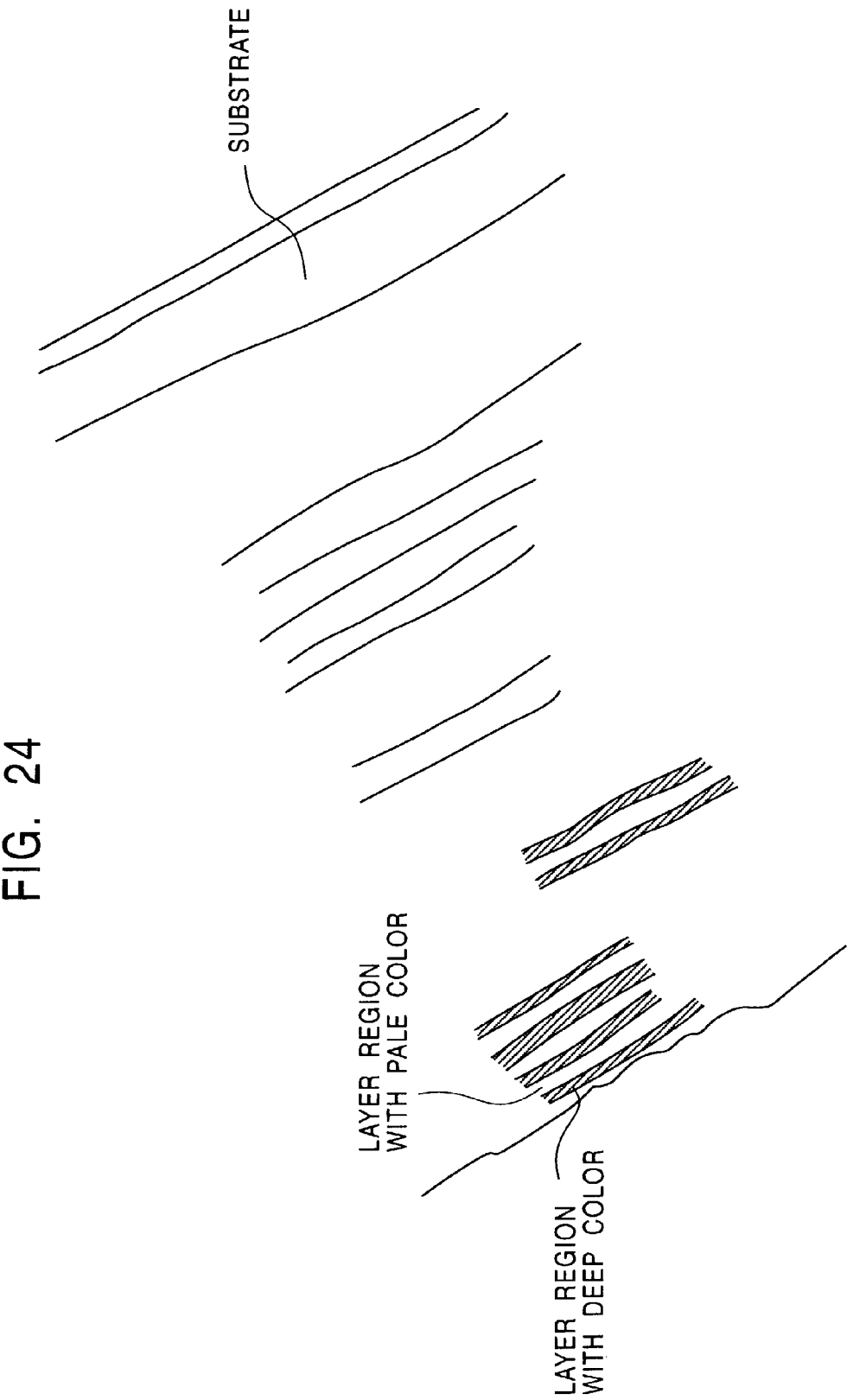
FIG. 24 shows a partially magnified cross section of the film configuration shown in FIG. 23.

FIG. 23 shows a transmission electron microscopic photograph (TEM photograph) of the cross section of the NiFe alloy of the sample B (with a variation cycle of the chemical composition of Fe of about 36 nm) in the direction of thickness, and FIG. 24 illustrates a partially magnified drawing of the transmission electron microscopic photograph shown in FIG. 23.

FIGS. 23 and 24 shows that stripes with a deep color and pale color, each elongating in the direction approximately parallel to the surface of the substrate, are alternately laminated on the cross section of the NiFe based alloy film as the sample B, although the stripes are a little difficult to distinguish as compared those in the film in FIGS. 21 and 22 as the sample C. No large crystal grains were found on the photograph shown in FIGS. 23 and 24.

The space between the layer regions with a deep color and pale color is narrower in FIGS. 23 and 24 than in FIGS. 21 and 22, because the variation cycle of the chemical composition of Fe in the NiFe based alloy film as the sample B is as short as 36 nm, in contrast to the variation cycle of the chemical composition of Fe of 72 nm in the NiFe based alloy film as the sample C.

Consequently, it was elucidated that the layers with a high chemical composition of Fe and low chemical composition of Fe are alternately laminated from the observation of the cross section of the soft magnetic film under a transmission electron microscopic photograph, when the chemical composition of Fe periodically changes in the direction of thickness as in the samples B and C.

Figure 25:
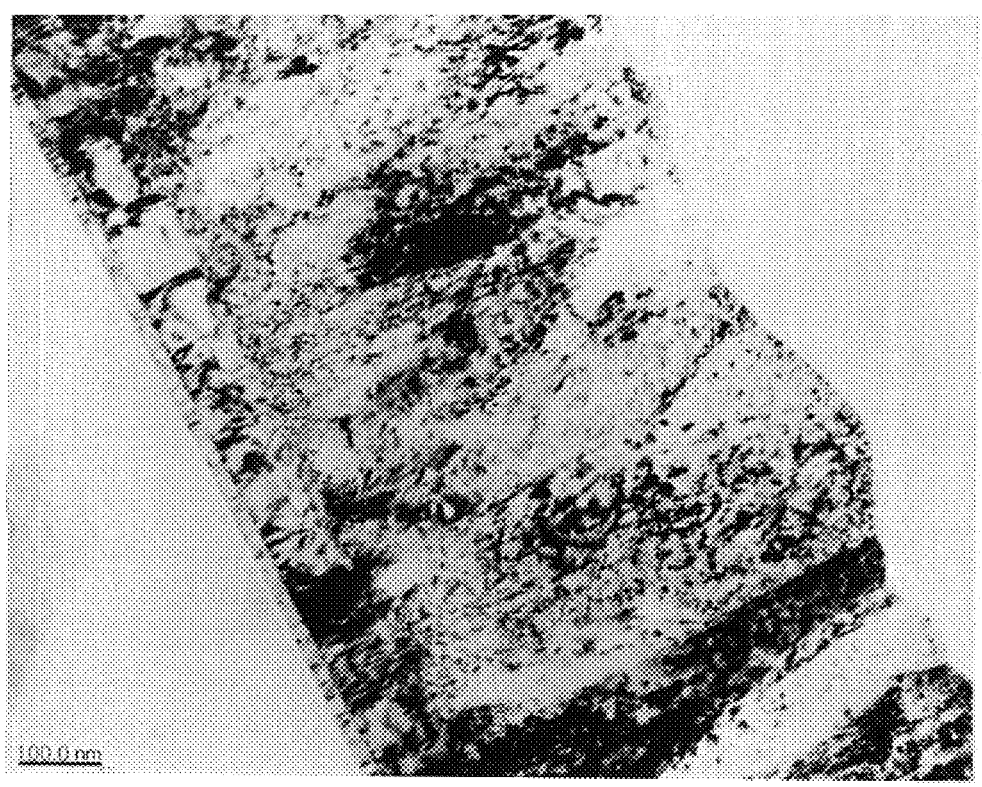
FIG. 25 is a transmission electron microscopic photograph showing the film configuration on the cross section of the NiFe based alloy film (sample D) in the direction of thickness.
Figure 26:
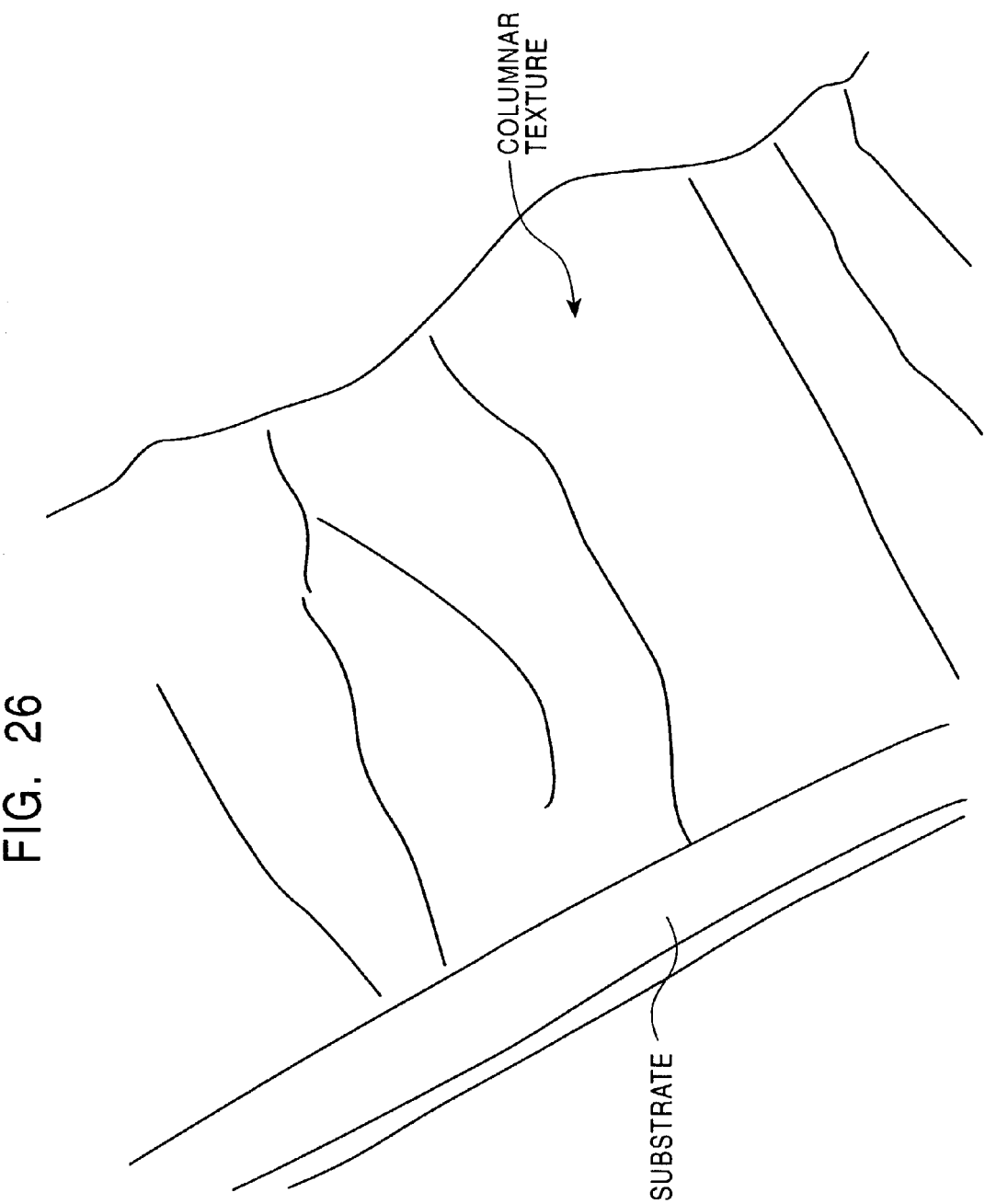
FIG. 26 shows a partially magnified cross section of the film configuration shown in FIG. 25.

FIG. 25 shows a transmission electron microscopic photograph (TEM photograph) of the cross section of the NiFe alloy of the sample D in the direction of thickness, and FIG. 26 illustrates a partially magnified drawing of the transmission electron microscopic photograph shown in FIG. 25.

In the NiFe based alloy as the sample D, or in the NiFe based alloy with a constant chemical composition of Fe with no substantial changes in the direction of thickness as shown in FIG. 25 and 26, no alternate lamination of the layer regions with a deep color and pale color was observed as in the samples B and C. However, giant crystalline textures were formed in the NiFe based alloy as the sample D as shown in FIGS. 25 and 26, and the crystalline texture (columnar texture) is elongating from on the substrate in the direction of thickness so as to reach the surface of the NiFe based alloy. The crystal grains were also larger than those in the samples B and C. The surface of the NiFe based alloy as the sample D showed larger surges as compared with the surfaces of the NiFe based alloys as the samples B and C (see FIGS. 21 to 24).

The crystal grain diameter of the NiFe based alloys as the samples B and C was smaller than the crystal grain diameter of the NiFe based alloy as the sample D, because the chemical composition of Fe changes in the direction of thickness with a periodic variation.

Figure 27:
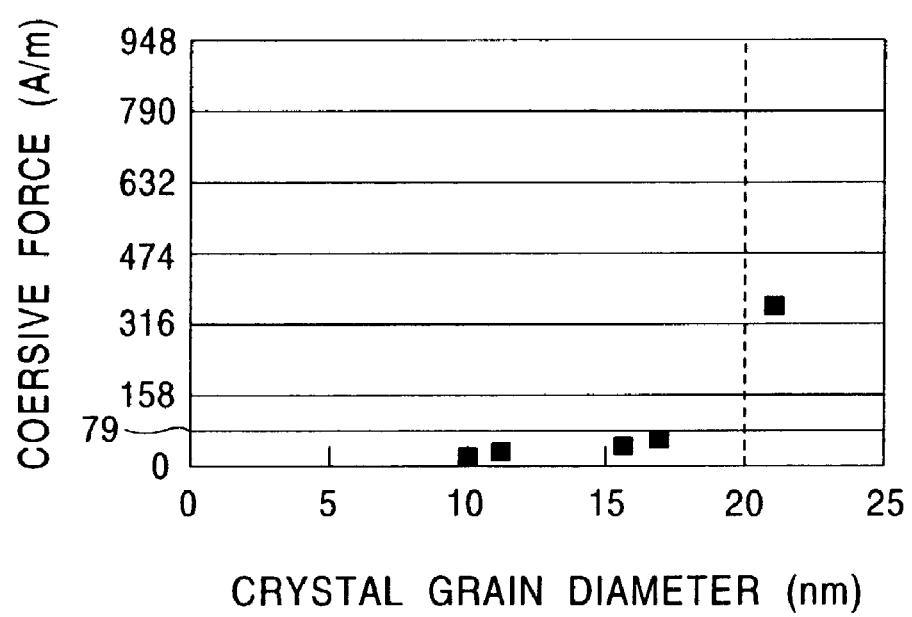
FIG. 27 is a graph showing the relation between the crystal grain diameter and coercive force Hc in the NiFe based alloy.

The relation between the crystal grain diameter determined by XRD (X-ray diffraction) and coercive force is shown in FIG. 27. The point where the crystal grain diameter exceeds 200 Å and the coercive force Hc exceeds 316 A/m (=4 Oe) shown in FIG. 27 was obtained from the experimental result of the NiFe based alloy in which the Fe content is approximately constant with no change in the direction of thickness as in the sample D. The remaining four points were obtained from the experimental results of the NiFe based alloys in which the chemical composition of Fe changes in the direction of thickness with a periodical variation as in the samples A and C.

FIG. 27 shows that the Coercive force Hc increases as the crystal grain diameter increases.

The preferable range of the crystal grain diameter was determined to be 200 Å or less from the experimental results shown in FIG. 27, since the coercive force may be suppressed below 79 A/m (=1 Oe) in the range of the crystal grain diameter as described above.

As hitherto described, a variable region in which the chemical composition of Fe changes in the direction of thickness is provided at least a part of the soft magnetic film according to the present invention comprising Fe and magnetic elements other than Fe. The difference of the proportions of Fe between the regions most abundant in Fe and most deficient in Fe is 4% by mass or more.

When the chemical composition of Fe periodically changes in the direction of thickness, the length of one cycle is preferably 150 nm or less.

According to the soft magnetic film as hitherto described, the saturation magnetic flux density Bs may be increased by increasing the mean chemical composition of Fe while enabling the coercive force Hc to be reduced by forming fine crystal grains even when the chemical composition of Fe is large.

Consequently, the soft magnetic film as hitherto described may be used for a core material and magnetic pole material of the recording thin film magnetic head (inductive head) to be mounted on a hard disk device that is able to comply with high density recording in the future with excellent recording characteristics.

What is claimed is:

1. A soft magnetic film comprising Fe and magnetic elements other than Fe, wherein the soft magnetic film comprises a variable region where chemical compositions of Fe change in a thickness direction of the soft magnetic film at least in a part of the soft magnetic film, a difference of the chemical composition of Fe between the regions most abundant in Fe and most deficient in Fe being 4% by mass or more, and at least a part of the chemical composition of Fe periodically varies in the direction of thickness with a length of one cycle of 10 nm or more and 150 nm or less.

2. The soft magnetic film according to claim 1, wherein the difference of the chemical composition of Fe is 6% by mass or more.

3. The soft magnetic film according to claim 1, wherein the difference of the chemical composition of Fe is 8% by mass or more.

4. The soft magnetic film according to claim 1, wherein the difference of the chemical composition of Fe is 10% by mass or more.

5. The soft magnetic film according to claim 1, wherein the length of one cycle is 100 nm or less.

6. The soft magnetic film according to claim 1, wherein a layer having a higher chemical composition of Fe and a layer having a lower chemical composition of Fe are alternately laminated in the direction of thickness.

7. The soft magnetic layer according to claim 1 comprising a region with a crystal grain diameter of 5 nm or more and 20 nm or less.

8. The soft magnetic layer according to claim 1 comprising a region where a body-centered cubic structure and a face-centered cubic structure are mixed together in at least a part of the soft magnetic film.

9. The soft magnetic layer according to claim 1 comprising a NiFe based alloy.

10. The soft magnetic layer according to claim 9 having a mean chemical composition of Fe of 65% by mass or more and 85% by mass or less.

11. The soft magnetic layer according to claim 1 comprising a CoFe based alloy.

12. The soft magnetic layer according to claim 11 having a mean chemical composition of Fe of 60% by mass or more and 80% by mass or less.

13. The soft magnetic layer according to claim 1 comprising a CoFeNi based alloy.

14. The soft magnetic film according to claim 13, wherein the mean chemical composition a of Co is 8% by mass or more and 48% by mass or less, the mean chemical composition b of Fe is 50% by mass or more and 90% by mass or less, and the mean chemical composition c of Ni is 2% by mass or more and 20% by mass or less, a sum of the mean chemical composition a+b+c accounting for 100% by mass.

15. The soft magnetic film according to claim 1 formed by plating.

16. A thin film magnetic head comprising a lower core layer made of a magnetic material, an upper core layer formed on the lower core layer with a magnetic gap thereon, and a coil layer for imparting a recording magnetic field to both core layers,
wherein at least one of the core layers is formed of the soft magnetic film according to claim 1.

17. The thin film magnetic head according to claim 16, wherein a lower magnetic pole layer is formed on the lower core layer by being raised up at an opposed face to a recording medium, and the lower magnetic pole layer is formed of the soft magnetic film.

18. A thin film magnetic head comprising a lower core layer and an upper core layer, and a magnetic pole part located between the lower core layer and upper core layer, a width of the magnetic pole part in a track width direction being restricted to be shorter than widths of the lower core layer and upper core layer,
wherein at least one of the magnetic pole part comprises a lower magnetic pole layer in succession to the lower core layer, an upper magnetic pole layer in succession to the upper core layer, and a gap layer located between the lower magnetic pole layer and upper magnetic pole layer, or the magnetic pole part comprises the upper magnetic pole layer in succession to the upper core layer and the gap layer located between the upper magnetic pole layer and lower core layer, and
wherein the upper magnetic pole layer, lower magnetic pole layer, and at least one of the upper core layer or the lower core layer are formed of the soft magnetic film according to claim 1.

* * * * *